(12) United States Patent
Salaam et al.

(10) Patent No.: US 10,858,619 B2
(45) Date of Patent: Dec. 8, 2020

(54) WATER-SOLUBLE UNIT DOSE ARTICLES MADE FROM EXTRUDED FILMS AND CONTAINING HOUSEHOLD CARE COMPOSITIONS AND METHODS FOR MAKING THE SAME

(71) Applicant: The Procter & Gamble Company, Cincinnati, OH (US)

(72) Inventors: Amanee Daarina Salaam, West Chester, OH (US); Norman Scott Broyles, Hamilton, OH (US); Emily Charlotte Boswell, Cincinnati, OH (US); Pier-Lorenzo Caruso, Frankfurt am Main (DE); Michaela Monika Czupik, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 19 days.

(21) Appl. No.: 16/004,071

(22) Filed: Jun. 8, 2018

(65) Prior Publication Data

US 2019/0376010 A1 Dec. 12, 2019

(51) Int. Cl.
| | |
|---|---|
| *C11D 17/04* | (2006.01) |
| *C11D 3/37* | (2006.01) |
| *C11D 11/00* | (2006.01) |
| *B65D 65/46* | (2006.01) |
| *C08K 5/053* | (2006.01) |

(52) U.S. Cl.
CPC ............ *C11D 17/045* (2013.01); *C08K 5/053* (2013.01); *C11D 3/3753* (2013.01); *C11D 11/0017* (2013.01); *C11D 17/042* (2013.01)

(58) Field of Classification Search
None
See application file for complete search history.

(56) References Cited

U.S. PATENT DOCUMENTS

| | | | |
|---|---|---|---|
| 4,119,604 A | 10/1978 | Wysong | |
| 6,946,501 B2 | 9/2005 | Kochvar | |
| 2004/0023826 A1* | 2/2004 | Duffield | B65B 9/042 510/295 |
| 2011/0189413 A1* | 8/2011 | Denome | C11D 17/045 524/387 |
| 2013/0244920 A1* | 9/2013 | Lee | C11D 3/38609 510/392 |
| 2014/0162929 A1* | 6/2014 | Labeque | C11D 3/42 510/296 |
| 2017/0058142 A1 | 3/2017 | Vicari | |
| 2017/0233539 A1* | 8/2017 | Friedrich | C11D 3/3753 510/296 |

(Continued)

FOREIGN PATENT DOCUMENTS

WO NO2005039499 A2 5/2005

OTHER PUBLICATIONS

Extended European Search Report; Application No. 19179153.2-1105; dated Oct. 19, 2016; 7 pages.

*Primary Examiner* — Lorna M Douyon
(74) *Attorney, Agent, or Firm* — Gregory S. Darley-Emerson

(57) ABSTRACT

The present disclosure relates to water-soluble unit dose articles made from a combination of water-soluble films and containing household care compositions that are at least partially enclosed by the water-soluble films in at least one compartment.

15 Claims, 3 Drawing Sheets

(56) References Cited

U.S. PATENT DOCUMENTS

2017/0355934 A1* 12/2017 Courchay .............. B65D 65/46
2017/0369822 A1* 12/2017 Souter ................... C07C 31/202
2017/0369823 A1* 12/2017 Souter ................... B65D 53/06
2018/0002647 A1    1/2018 Souter

* cited by examiner

WATER-SOLUBLE UNIT DOSE ARTICLES MADE FROM EXTRUDED FILMS AND CONTAINING HOUSEHOLD CARE COMPOSITIONS AND METHODS FOR MAKING THE SAME

FIELD OF THE INVENTION

The present disclosure relates to water-soluble unit dose articles made from a combination of water-soluble films and containing household care compositions. The present disclosure further relates to methods of making and using such water-soluble unit dose articles.

BACKGROUND OF THE INVENTION

Water-soluble polymeric films are commonly used as packaging materials to simplify dispersing, pouring, dissolving and dosing of a material to be delivered. For example, water-soluble unit dose articles made from water-soluble film are commonly used to package household care compositions, e.g., a pouch containing a laundry or dish detergent. A consumer can directly add the unit dose article to a mixing vessel, such as a bucket, sink or washing machine. Advantageously, this provides for accurate dosing while eliminating the need for the consumer to measure the composition. The unit dose article may also reduce mess that would be associated with dispensing a similar composition from a vessel, such as pouring a liquid laundry detergent from a bottle. The unit dose article also insulates the composition therein from contact with the user's hands. In sum, water-soluble unit dose articles containing pre-measured agents provide for convenience of consumer use in a variety of applications.

Some water-soluble polymeric films that are used to make unit dose articles will incompletely dissolve during a wash cycle, leaving film residue on items within the wash. Such problems may particularly arise when the unit dose article is used under stressed wash conditions, such as when the unit dose article is used in cold water (e.g., water as low as about 5° C. and/or up to about 10° C. or about 15° C.), in a short wash cycle, and/or in a low-water wash cycle (e.g., wash liquors from about 3 L to about 20 L). Notably, environmental concerns and energy cost are driving consumer desire for utilizing colder wash water and shorter wash cycles.

Additionally, some water-soluble polymeric films that are used to make unit dose articles have insufficient barrier properties, allowing for higher occurrences of chemical species within the household care compositions to migrate outside of the compartment in which the species is housed, for instance, through the outer film housing into the atmosphere, and/or through internal film walls into other compartments. An internal film wall may be a single-layer film or a water-soluble multilayer film composite that separates the interior of a water-soluble unit dose article into at least a first compartment and a second compartment. Loss of chemical species into the atmosphere or into other compartments may cause a less satisfactory consumer experience, as there may be less of the chemical species available to provide benefits to the laundry. Additionally, when certain incompatible species come into contact with one another, they may interact in such a way that some of one or both of the species' effectiveness is lowered. Further, it is important for certain chemical species to remain within the unit dose article as if the species was to migrate outside of the unit dose article onto the surface of the outer film housing, it may be displeasing to consumers. For instance, if a hueing dye agent migrated to the surface of the outer film housing, a consumer may end up with dye on their hands when handling the unit dose article.

It is further desirable for the water-soluble unit dose article to have adequate strength, both soon after making and upon storage, to withstand forces that may be applied during packing, transport, storage, and usage. Adequate strength may be particularly preferred with unit dose articles encapsulating liquid compositions, such as laundry detergent, to avoid unintentional bursting and/or leakage.

Manufacturing water-soluble unit dose articles having good dissolution in various wash conditions, adequate barrier properties, and adequate strength can prove to be challenging for manufacturers. Common film-forming processes include solution cast and extrusion cast processes. Manufacturers often form films by solution cast methods. However, formulating for solution cast processes is oftentimes challenging for manufacturers as solution cast processes use water throughout the process which may require more technical complexity in formulating. Further, solution cast processes take longer in time when compared with extrusion processes, thereby allowing for fewer water-soluble films to be created within a given timeframe. Further, solution cast processes may not provide for multiple layers of film to be manufactured with ease, thus making formulating even more complex for manufacturers as they must determine formulations that provide films having multiple desired characteristics within a single formulation.

There remains a need for water-soluble films for forming water-soluble unit dose articles having the desired characteristics of good water solubility (e.g., cold water solubility), sufficient barrier properties, adequate film strength, and ease of manufacturing.

SUMMARY OF THE INVENTION

The present disclosure relates to a water-soluble unit dose article comprising: one or more layers of a first water-soluble film; one or more layers of a second water-soluble film; wherein the first water-soluble film is sealed to the second water-soluble film to form at least one sealed compartment; at least one household care composition at least partially enclosed within the sealed compartment; wherein each of the first water-soluble film and the second water-soluble film independently comprises: a polyvinyl alcohol (PVOH) polymeric resin and/or blend thereof, wherein from about 95% to about 100% of the polyvinyl alcohol (PVOH) polymeric resin and/or blend thereof is characterized by having a weight average molecular weight of from about 20,000 Da to about 94,500 Da, and wherein no more than about 5% of the polyvinyl alcohol (PVOH) polymeric resin and/or blend thereof is characterized by having a weight average molecular weight of greater than about 95,000 Da; one or more plasticizers; and wherein each of the first water-soluble film and the second water-soluble film independently exhibits a water vapor transmission rate of from about 50 g/(m²·day) to about 90 g/(m²·day) as measured according to the Water Vapor Transmission Test Method described herein.

The present disclosure further relates to a water-soluble unit dose article comprising: a first water-soluble multilayer film composite comprising two or more layers of a water-soluble film; a second water-soluble multilayer film composite comprising two or more layers of the water-soluble film; wherein the first water-soluble multilayer film composite is sealed to the second water-soluble multilayer film composite to form at least one sealed compartment; at least one household care composition at least partially enclosed within the sealed compartment; wherein the water-soluble film of each of the layers independently comprises: a polyvinyl alcohol (PVOH) polymeric resin and/or blend thereof, wherein from about 95% to about 100% of the polyvinyl alcohol (PVOH) polymeric resin and/or blend thereof is characterized by having a weight average molecular weight of from about 20,000 Da to about 94,500 Da, and wherein no more than about 5% of the polyvinyl alcohol (PVOH) polymeric resin and/or blend thereof is characterized by having a weight average molecular weight of greater than about 95,000 Da; one or more plasticizers; and wherein each of the first water-soluble multilayer film composite and the second water-soluble multilayer film composite independently comprises at least an inward facing layer and an outward facing layer, wherein the inward facing layer of the first water-soluble multilayer film composite is chemically different than the outward facing layer of the first water-soluble multilayer film composite.

The present disclosure relates to a method of making a water-soluble unit dose article, the method comprising the steps of: extruding one or more layers of a first water-soluble film; extruding one or more layers of a second water-soluble film; shaping the first water-soluble film to form an open compartment; providing a household care composition; loading the open compartment with the household care composition; and sealing the open compartment with the second water-soluble film to form a water-soluble unit dose article having the sealed compartment having the household care composition enclosed therein.

The present disclosure also relates to methods using such water-soluble unit dose articles.

BRIEF DESCRIPTION OF THE DRAWINGS

The figures herein are illustrative in nature and are not intended to be limiting.

DETAILED DESCRIPTION OF THE INVENTION

Definitions

Figure 1:
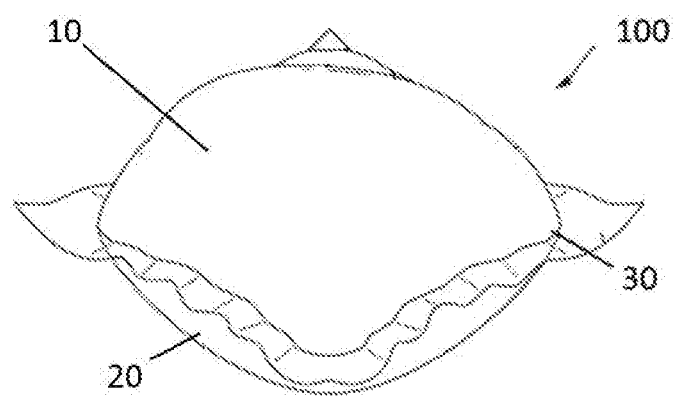
FIG. 1 shows a perspective view of a water-soluble unit dose article.

As used herein, the articles "a" and "an" when used in a claim, are understood to mean one or more of what is claimed or described. As used herein, the terms "include," "includes," and "including" are meant to be non-limiting.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than about 1%, or less than about 0.1%, or less than about 0.01%, or even 0%, by weight of the composition.

The water-soluble unit dose articles of the present disclosure may contain a composition, for example a household care composition. The composition can be selected from a liquid, solid or combination thereof. As used herein, "liquid" includes free-flowing liquids, as well as pastes, gels, foams and mousses. Non-limiting examples of liquids include light duty and heavy-duty liquid detergent compositions, fabric enhancers, detergent gels commonly used for laundry, bleach and laundry additives. Gases, e.g., suspended bubbles, or solids, e.g., particles, may be included within the liquids. A "solid" as used herein includes, but is not limited to, powders, agglomerates, and mixtures thereof. Non-limiting examples of solids include: granules, micro-capsules, beads, noodles, and pearlised balls. Solid compositions may provide a technical benefit including, but not limited to, through-the-wash benefits, pre-treatment benefits, and/or aesthetic effects.

As used herein, the term "homopolymer" generally includes polymers having a single type of monomeric repeating unit (e.g., a polymeric chain consisting of or consisting essentially of a single monomeric repeating unit). For the particular case of polyvinyl alcohol (PVOH), the term "homopolymer" (or "PVOH homopolymer" or "PVOH polymer") may further include polymers having a distribution of vinyl alcohol monomer units and vinyl acetate monomer units, depending on the degree of hydrolysis (e.g., a polymeric chain consisting of or consisting essentially of vinyl alcohol and vinyl acetate monomer units). In the limiting case of 100% hydrolysis, a polyvinyl alcohol (PVOH) homopolymer can include a true homopolymer having only vinyl alcohol units.

As used herein, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinyl alcohol (PVOH), the term "copolymer" (or "PVOH copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a polyvinyl alcohol (PVOH) copolymer can include a copolymer having vinyl alcohol units and one or more other monomer units, but no vinyl acetate units.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C., under atmospheric pressure, and at 50% relative humidity.

In the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Water-Soluble Unit Dose Article

Water-soluble unit dose articles may be pouches or packages containing a pre-measured quantity of one or more compositions, such as household care compositions. The compositions can be included in a compartment formed by sealing one or more water-soluble films together. As can be appreciated, water-soluble unit dose articles provide convenient dispensing of compositions for applications such as laundry and dishwashing.

The water-soluble unit dose article described herein may comprise a first water-soluble film and a second water-soluble film shaped such that the unit-dose article comprises at least one internal compartment surrounded by the water-soluble films. The water-soluble films may be sealed to one another such to form at least one sealed compartment. The water-soluble unit dose article may comprise a household care composition at least partially enclosed within the sealed compartment, such that the household care composition does not leak out of the compartment during storage. However, upon addition of the water-soluble unit dose article to water during a washing operation, the water-soluble film dissolves and releases the contents of the internal, sealed compartment into the wash liquor. The water-soluble unit dose article may be a pouch.

FIG. 1 illustrates an example of a water-soluble unit dose article 100 formed from a first water-soluble film 10 and a second water-soluble film 20 sealed at a seal area 30. Each or both of the first water-soluble film 10 and the second water-soluble film 20 may include the polyvinyl alcohol (PVOH) polymeric resin and/or blend thereof according to the present disclosure.

Figure 2:
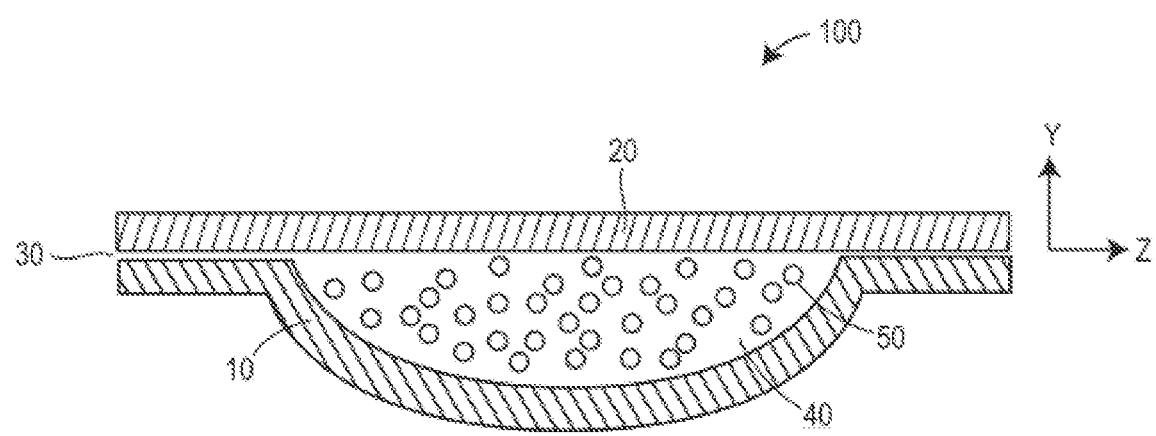
FIG. 2 shows a side cross-sectional view of a water-soluble unit dose article.

FIG. 2 depicts an example of a side cross-sectional view of a water-soluble unit dose article 100 formed from a first water-soluble film 10 and a second water-soluble film 20 sealed at a seal area 30. The first water-soluble film 10 and the second water-soluble film 20 may define an interior compartment 40 having a volume which may contain any desired household care composition 50 according to the present disclosure, preferably a liquid laundry detergent, for release into an aqueous environment.

The area in which the two water-soluble films meet and are sealed together is referred to as the seal area. Often, the seal area comprises a 'skirt' or 'flange' which comprises area of the first water-soluble film sealed to an area of the second water-soluble film and which generally protrudes out from the main body of the water-soluble unit dose article. A preferred method of making a water-soluble unit dose article is described in more detail below.

A compartment should be understood as meaning a closed internal space within the water-soluble unit dose article, which may hold the household care composition. During manufacture, the first water-soluble film according to the present invention may be shaped to comprise an open compartment into which the household care composition is added. The second water-soluble film according to the present invention is then laid over the first water-soluble film in such an orientation as to close the opening of the compartment. The first water-soluble film and second water-soluble film are then sealed together along a seal area.

Figure 3:
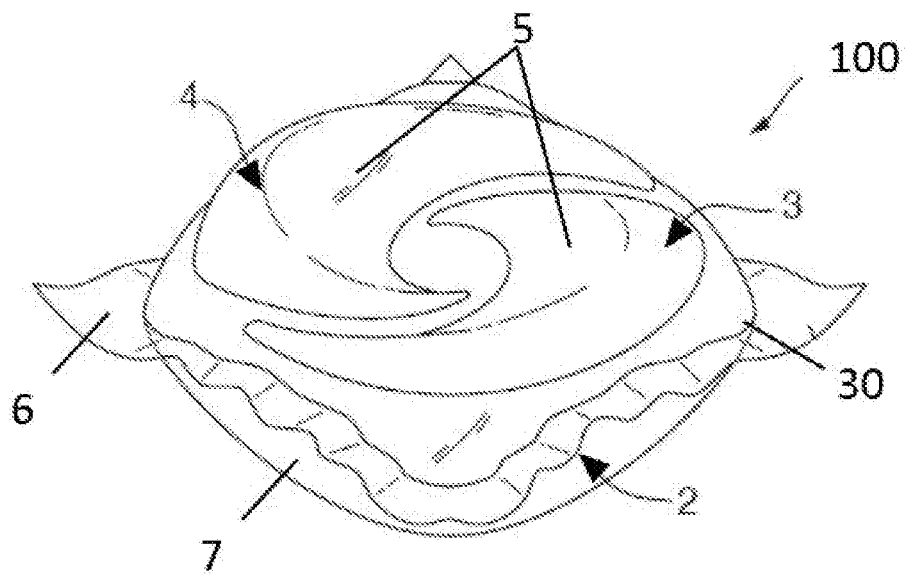
FIG. 3 shows a multi-compartment water-soluble unit dose article.

The water-soluble unit dose article may comprise more than one compartment, even at least two compartments, or even at least three compartments. FIG. 3 illustrates a water-soluble unit dose article 100 having multiple compartments, or a multi-compartment water-soluble unit dose article 100. The water-soluble unit dose article 100 may have a first compartment 3, a second compartment 4, and a third compartment 2. As shown in FIG. 3, the first compartment 3 and the second compartment 4 may be arranged in superposed orientation, i.e., one positioned on top of the other, on the larger bottom compartment, the third compartment 2. As shown in FIG. 3, the first compartment 3 and the second compartment 4 are smaller in volume than the third compartment 2. The first compartment 3 and the second compartment 4 are oriented side-by-side. Here, the first compartment 3 and the second compartment 4 are oriented in a 'tyre and rim' arrangement, i.e., a first compartment 3 positioned next to the second compartment 4, the first compartment 3 at least partially surrounding the second compartment 4, but does not completely enclose the second compartment 4. Alternatively, one compartment may be completely enclosed within another compartment.

In another non-limiting example, compartments may be packed in a string, each compartment being individually separable by a perforation line Hence each compartment may be individually torn-off from the remainder of the string by the end-user, for example, so as to pre-treat or post-treat a fabric with a composition from a compartment.

In such multi-compartment water-soluble unit dose article 100 orientations, the water-soluble unit dose article 100 may comprise three film sections: a top film section 5, a middle film section 6, and a bottom film section 7. Each of the top film section 5, middle film section 6, and bottom film section 7 may independently be formed of any of the water-soluble films disclosed herein. More than one film section may be formed of the same water-soluble film. Preferably, the middle film section 6 is a water-soluble film having good barrier properties and the top film section 5 and the bottom film section 7 are water-soluble films having good tensile strength properties. In multi-compartment water-soluble unit dose article 100 orientations, the bottom film section 7 may be shaped to comprise an open compartment into which the household care composition is added. The middle film section 6 may then be placed on top of the open portion of the open compartment and sealed about the seal area 30. The top film section 5 may separately be shaped to comprise an open compartment into which the household care composition is added. The top film section 5 may be shaped to comprise two open compartments into which two different household care compositions are added. The middle film section 6, already sealed with the bottom film section 7, may then be laid over the top film section 5 in such an orientation as to close the opening(s) of the one or more open compartments formed of the first film section 5. The top film section 5 and the middle film section 6 are then sealed at the seal area 30.

Wherein the water-soluble unit dose article comprises at least two compartments, one of the compartments may be smaller than the other compartment. Wherein the water-soluble unit dose article comprises at least three compartments, two of the compartments may be smaller than the third compartment, and preferably the smaller compartments are superposed on the larger compartment. The superposed compartments preferably are orientated side-by-side. The compartments of multi-compartment water-soluble unit dose articles may be of the same or different size(s) and/or volume(s).

In a multi-compartment water-soluble unit dose article orientations, the household care composition according to the present invention may be comprised in at least one of the compartments. It may, for example, be comprised in just one compartment, or may be comprised in two compartments, or even in three compartments. Each compartment may comprise the same or different household care compositions. The different household care compositions may all be in the same form, or they may be in different forms.

In a non-limiting example, the water-soluble unit dose article may comprise at least two internal, sealed compartments, wherein a household care composition, preferably a laundry detergent composition, is comprised in at least one of the compartments, preferably wherein the unit dose article comprises at least three compartments, wherein the laundry detergent composition is comprised in at least one of the compartments.

Water-Soluble Films

As can be appreciated, it is believed that water-soluble unit dose articles formed of water-soluble unit dose films of the present invention have a good dissolution profile, good tensile strength, and good barrier properties. It is further believed that extruding such water-soluble films, formed of polyvinyl alcohol (PVOH) polymeric resins and/or thereof characterized by low molecular weights, of the present invention may allow for the above properties while also being simpler to formulate. Extruding such water-soluble films of the present invention may allow for multiple layers of water-soluble film wherein each layer of water-soluble film may comprise different properties, such that the aggregate of the multiple layers of water-soluble film forms a water-soluble multilayer film composite. Such water-soluble multilayer film composites may provide for multiple properties (e.g., one or more layers having good barrier properties and one or more layers having good tensile strength properties). Extruding such water-soluble films of the present invention may further allow for varying total thickness of the water-soluble multilayer film composite, or the total thickness of all of the undeformed thicknesses of each layer of film. Such properties and benefits of the water-soluble unit dose article, the water-soluble film, and the components thereof, are further explained below.

The water-soluble unit dose article may comprise one or more layers of a first water-soluble film and one or more layers of a second water-soluble film. The first water-soluble film may be chemically different than the second water-soluble film. The first water-soluble film may be substantially identical to the second water-soluble film.

In the context of the present invention, "chemically different" herein means where the polymeric film compositions created from manufacture prior to forming the water-soluble unit dose article have at least one substance present in at least one of the film compositions that differentiates the first water-soluble film from the second water-soluble film composition and impacts at least one of the chemical or physical properties of the film, such as, but not limited to, dissolution rate, water vapor transmission rate, oxygen transmission rate, water capacity, and tensile strength, rendering this at least one chemical or physical film property different between the first water-soluble film and the second water-soluble film. Varying chemical compositions of films due to natural making processes i.e., batch to batch variations are as such not considered chemically different films within the scope of this invention.

Non-limiting examples of chemically differentiating substances include use of different polymer target resins and/or proportions within the composition thereof, different plasticizer compositions and/or proportions within the composition thereof, or different additional film components and/or proportions within the composition thereof. Water-soluble unit dose articles comprising films solely differing in physical properties but having the same substance content and same proportions, such as, for example, films solely differing in film thickness, are not considered to be chemically different within the scope of this invention. Unit dose articles made from films being solely differentiated through the presence versus the absence of a coating layer are also not considered to be chemically different within the scope of this invention.

In the context of the present invention, "substantially identical" herein means where the polymeric film compositions created from manufacture prior to forming the water-soluble unit dose article do not have any substance present in at least one of the film compositions that differentiates the first water-soluble film from the second water-soluble film composition as so much to impact at least one of the chemical or physical properties of the film, such as, but not limited to, dissolution rate, water vapor transmission rate, oxygen transmission rate, water capacity, and/or tensile strength, rendering this at least one chemical or physical film property different between the first water-soluble film and the second water-soluble film.

As the water-soluble film at least partially encloses a household care composition in at least one compartment of the water-soluble unit dose article, the water-soluble film formed should comprise such chemical properties that the water-soluble film adequately dissolves under conditions of intended use (aqueous environments) and that chemical species of the one or more household care compositions contained within the one or more compartments do not migrate (or have reduced transition and migration rates) out of any of the one or more compartments of the water-soluble unit dose article through the film, into either the atmosphere or into other compartments of the water-soluble unit dose article. By 'chemical species' it is meant any chemical species within the household care composition. This is especially important for water-soluble unit dose articles having multiple compartments and different household care compositions within each compartment, where certain chemical species of a household care composition within one compartment are incompatible with another chemical species of a separate household care composition contained within a separate compartment.

Improving the barrier properties of a water-soluble film can cause water-soluble unit dose articles formed from the water-soluble films to exhibit a number of beneficial improvements. As used herein, barrier properties generally refer to the transmission and migration of chemical species through the water-soluble film including oxygen, water vapor, and other chemical compounds. The water-soluble films described herein can demonstrate reduced transmission and migration rates for chemical species of ingredients such as those contained within the household care compositions contained within the water-soluble unit dose article. As can be appreciated, the water-soluble films described herein can reduce, or eliminate, detrimental interactions between incompatible chemical species and produce unit dose articles having increased lifespans. For example, the water-soluble films can exhibit improved resistance to the migration of optical dyes, surfactants, and perfumes contained within a water-soluble unit dose article, both migration external the water-soluble unit dose article into the atmosphere as well as migration among compartments within a multi-compartment water-soluble unit dose article. Such properties can improve the lifespan of the packaging or prevent "weeping" or tacky feel as chemicals migrate out of the packaging. For example, compounds such as bittering agents contained within the film can be resistant to migration out of the film. The water-soluble unit dose articles can include compositions which could not previously be contained within the water-soluble unit dose article. For example, the water-soluble unit dose articles can include certain perfumes and colorants that could not previously be stored in a unit dose article without suffering from debilitating interactions. Such properties can improve consumer satisfaction by preventing loss and/or lowered effectiveness of chemicals from the water-soluble unit dose article.

Any of the water-soluble films described herein can have a water vapor transmission rate measured in accordance to the Water Vapor Transmission Rate Test Method described herein of from about 50 g/(m²·day) to about 90 g/(m²·day), or from about 55 g/(m²·day) to about 85 g/(m²·day), or from about 60 g/(m²·day) to about 80 g/(m²·day), and any integer therebetween.

Improving the tensile properties of a water-soluble film can cause water-soluble unit dose articles formed from the water-soluble films to exhibit a number of beneficial improvements. As used herein, tensile properties generally refer to tensile strength at break, tensile elongation at break, and tensile strain at break, among other properties not listed. Such tensile properties determine to a large extent how well the film will run on a manufacturing, or converting, line as well as how well the film keeps from rupturing or breaking prematurely, or before it is intended to within an aqueous environment. As can be appreciated, the water-soluble films described herein can reduce, or eliminate, film rupturing or breakage on manufacturing lines as well as when water-soluble unit dose articles are stored within containers when provided to consumers. Such properties can increase the number of water-soluble unit dose articles able to be manufactured within a given timeframe as ruptured films do not need to be removed from the line. Such properties can further improve consumer experience as the consumer will be less susceptible to purchasing containers filled with water-soluble unit dose articles wherein one or more of the water-soluble unit dose articles has ruptured, resulting in stickiness on the other unit dose articles and container, and loss of product.

Tensile strength, as used in the present disclosure, refers to the capacity of the water-soluble film to withstand loads tending to elongate the film. Tensile strength is measured by the peak, or maximum stress, that the water-soluble film can withstand while being stretched or pulled before breaking or tearing. The water-soluble film of the present disclosure may be characterized by a tensile strength of from about 20 to about 40 mPa, preferably from about 22 to about 37 mPa, even more preferably from about 23 to about 35 mPa, most preferably from about 25 to about 32 mPa, as measured according to the Tensile Strength Test Method described herein.

The water-soluble films can include relatively small amounts of moisture (water) in certain examples. The moisture can prevent cracking of the water-soluble films. Generally, suitable levels of the moisture can include from about 3.5% to about 7.5% water by weight of the water-soluble film. As can be further appreciated, the moisture levels can vary depending on environmental conditions and can reach ranges outside of from about 3.5% to about 7.5%. For example, in very dry conditions, the water-soluble films can reach a moisture level of about 1%. In very humid environments, the water-soluble films can reach a moisture level of about 10%. The moisture level is of the water-soluble film prior to being formed into the water-soluble unit dose article (e.g., pouch).

In addition to the characteristics of the various components from which the water-soluble film is formed, the undeformed thickness of each layer of the water-soluble film as well as the number of layers of water-soluble film forming the water-soluble multilayer film composite may affect the dissolution rate, tensile strength, and water vapor transmission rate, of the water-soluble multilayer film composite as a whole (or the single film layer when there is only one layer). The dissolution rate, tensile strength, and water vapor transmission rate of the water-soluble multilayer film composite is not to be confused with the individual dissolution rates, tensile strengths, and water vapor transmission rates of the individual water-soluble film layers. For example, two water-soluble films joined together or co-extruded to form a water-soluble multilayer film composite may each have different water vapor transmission rates. The two separate water-soluble films may together affect the migration of species through the water-soluble multilayer film composite that results in a different water vapor transmission rate than each water-soluble film layer on its own.

Undeformed thickness, or caliper, as used in the present disclosure, refers to the measurement of the thickness of a single layer of the water-soluble film. A single layer of film is measured perpendicular to the major face of the film water-soluble multilayer film composite when the single layer of film is lying flat in a planar condition. In manufacturing water-soluble unit dose articles comprising one or more layers of water-soluble film at least partially enclosing a household compositions in one compartment, it is important that the undeformed thickness of the water-soluble film be of a minimum thickness as to provide mechanical support to sufficiently support the weight of the household care composition enclosed without breaking the film. It is also important that the undeformed thickness measurement, or caliper, be as consistent as possible throughout the water-soluble film. Inconsistencies in caliper throughout the water-soluble film may cause problems when manufacturing the water-soluble unit dose articles, for instance, when attempting to seal the edges of the water-soluble film together.

Each of the first water-soluble film and the second water-soluble film may independently have an undeformed thickness before incorporation into the water-soluble unit dose article of from about 5 μm to about 200 μm, preferably from about 50 μm to about 100 μm, more preferably from about 60 μm to about 80 μm. Preferably the difference in undeformed thickness before incorporation into the water-soluble unit dose article between the first water-soluble film and the second water-soluble film is less than about 50%, preferably less than about 30%, more preferably less than about 20%, even more preferably less than about 10%, or the thicknesses may be equal.

In various examples wherein there are multiple layers of water-soluble film forming a water-soluble multilayer film composite, it can be useful to select the thickness of each layer such that each layer, as well as the water-soluble multilayer film composite in the aggregate, exhibit favorable or controlled dissolution times, water vapor transmission rates, and tensile strengths. As can be appreciated, varying the thickness of each water-soluble film layer as well as selecting water-soluble film layers having different properties may be useful in forming water-soluble unit dose articles having improved dissolution, barrier properties, tensile strength, and sealing. The multiple layers of water-soluble film forming a water-soluble multilayer film composite may each be independently chemically different from one another. The multiple layers of water-soluble film forming a water-soluble multilayer film composite may each be independently of different undeformed thicknesses from one another. It may be useful in certain examples to select polymeric resins and/or blends thereof to form each layer based on the above mentioned desired properties.

Figure 4:
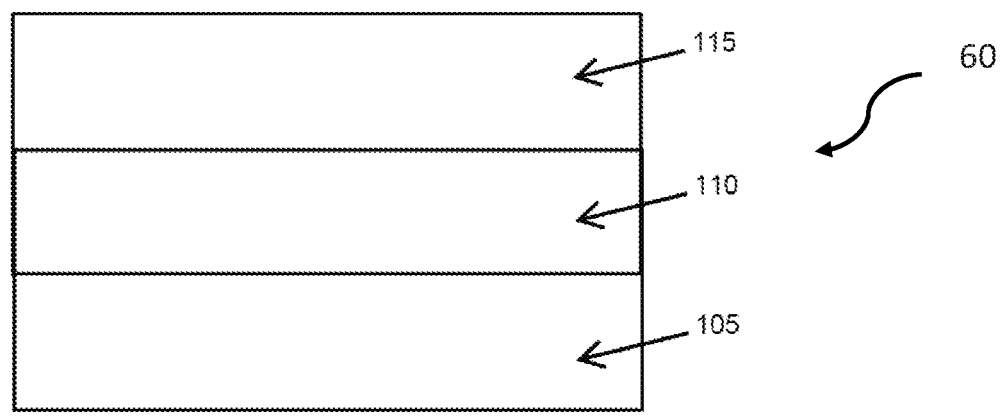
FIG. 4 shows a diagram of a water-soluble multilayer film composite formed of three layers.

FIG. 4 depicts a water-soluble multilayer film composite 60 formed of three layers. As illustrated by FIG. 4, the depicted water-soluble multilayer film composite 60 includes an inward facing layer 105, a middle layer 110, and an outward facing layer 115. An inward facing layer 105 may be thought of as layers not exposed to the atmosphere, to consumer touch, and/or to the other objects, but facing or in close contact with a household care composition. An outward facing layer 115 may be thought of as layers facing the atmosphere outside of the water-soluble unit dose article and/or layers a consumer is able to touch and/or layers that can come into contact with outside objects. An outward facing layer 115 may comprise an outer film housing of the water-soluble unit dose article. As can be appreciated, at least one of the layers can be formed of the polyvinyl alcohol (PVOH) polymeric resin and/or blends thereof described herein. In certain examples, each of the inward facing layer 105, middle layer 110, and outward facing layer 115 can be formed of the polyvinyl alcohol (PVOH) polymeric resin and/or blends thereof described herein each layer being chemically different or substantially identical to any other layer.

In an example, the inward facing layer 105 of a water-soluble film may be chemically different than the outward facing layer 115 of the water-soluble film. Although the inward facing layer 105, middle layer 110, and outward facing 115 are generally depicted as being of equal thickness, it can be appreciated that each of the layers can have a different thickness.

Figure 5:
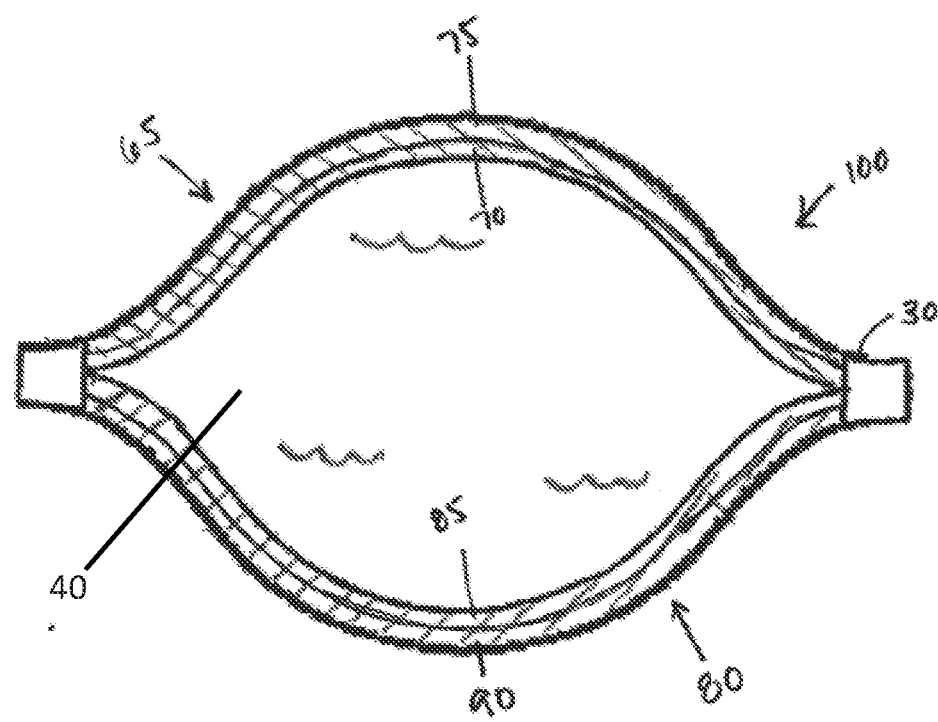
FIG. 5 shows a side cross-sectional view of a multi-compartment water-soluble unit dose article formed of two water-soluble multilayer film composites.

FIG. 5 shows a side cross-sectional view a multi-compartment water-soluble unit dose article 100 formed of two water-soluble multilayer film composites, a first water-soluble multilayer film composite 65 and a second water-soluble multilayer film composite 80. The first water-soluble multilayer film composite 65 may be sealed to the second water-soluble multilayer film composite 80 to form at least one sealed compartment 40. The first water-soluble multilayer film composite 65 may comprise two or more layers of a water-soluble film, such as a first water-soluble multilayer film composite inward facing layer 70 and a first water-soluble multilayer film composite outward facing layer 75. The second water-soluble multilayer film composite 80 may comprise two or more layers of a water-soluble film, such as a second water-soluble multilayer film composite inward facing layer 85 and a second water-soluble multilayer film composite outward facing layer 90. The first water-soluble multilayer film composite inward facing layer 70 may be chemically different than the first water-soluble multilayer film composite outward facing layer 75. The second water-soluble multilayer film composite inward facing layer 85 may be chemically different than the second water-soluble multilayer film composite outward facing layer 90. Generally, each of the water-soluble multilayer film composites of the water-soluble unit dose article may comprise two or more layers of a water-soluble film. Each of the first water-soluble multilayer film composite and the second water-soluble multilayer film composite, and any other number of water-soluble multilayer film composites, may independently comprise at least an inward facing layer and an outward facing layer, wherein the inward facing layer of the first water-soluble multilayer film composite is chemically different than the outward facing layer of the first water-soluble multilayer film composite.

For example, it can be useful to include a polymeric resin and/or blend thereof with strong barrier properties and strong sealing strength, for inward facing layers and other polymeric resins and/or blends thereof with strong tensile properties for outward facing layers. The resulting water-soluble multilayer film composite may provide for a water-soluble unit dose article that is less susceptible to leakage given its improved sealing and/or tensile properties as well as a water-soluble unit dose article that provides for less migration of ingredients through the film into the atmosphere. In another example, it can be useful to have a relatively thick outward facing layer which resists dissolution for about 30 seconds or more, or about 45 seconds or more. As can be appreciated, such dissolution times can offer a number of benefits to a water-soluble film including minimizing premature dissolution of the water-soluble film and the risk of moisture contained within a container housing the water-soluble unit dose articles migrating into the water-soluble unit dose article through the film, potentially resulting in premature dissolution of the water-soluble unit dose article. In addition, varying the thicknesses of the layers may also contribute to dissolution times, migration, and strength of the film. For example, relatively thinner inward facing and middle layers can ensure that a water-soluble film can rapidly dissolve after dissolution of the outward facing layer. Because the water-soluble films of the present invention are formed via extrusion processes, water-soluble multilayer film composites of film layers having varying thicknesses can readily be formed. Manufacture via extrusion casting is further described hereinafter.

For internal film walls separating compartments within the water-soluble unit dose article wherein none of the layers are outward facing layers exposed to the atmosphere, the water-soluble multilayer film composite may be comprised of any number of water-soluble film layers having any combination of desired properties, chemical and/or mechanical. For example, a water-soluble multilayer film composite of two water-soluble film layers may be formed, the water-soluble multilayer film composite forming an internal film wall separating a first compartment from a second compartment within the water-soluble unit dose article, wherein one inward facing layer facing the household care composition contained within the first compartment may be of a certain barrier property and the other inward facing layer facing the household care composition contained within the second compartment may be of a different barrier property. Such multiple layers are beneficial when one compartment contains a composition having a chemical species that requires a certain barrier property whereas another compartment may have a composition having a different chemical species that requires a different barrier property.

The water-soluble films described herein can be further modified through unilateral or bilateral film orientation. Generally, any of the water-soluble films can be orientated through known techniques such as the use of elevated temperature biaxial orientation using a dedicated machine. Bilaterally orientated water-soluble films can exhibit a variety of improved properties. For example, bilaterally stretched films can exhibit improved dissolution times with dissolution occurring in seconds instead of minutes.

The water-soluble film may be opaque, transparent or translucent. The water-soluble film may comprise a printed area. The area of print may cover an uninterrupted portion of the water-soluble film or it may cover parts thereof. The area of print may comprise inks, pigments, dyes, bluing agents or mixtures thereof. The area of print may comprise a single color or multiple colors. The print may be present as a layer on the surface of the water-soluble film or may at least partially penetrate into the water-soluble film. The water-soluble film may comprise a first side and a second side. The area of print may be achieved using standard techniques, such as flexographic printing or inkjet printing. The area of print may be on either or both the first and the second sides of the film. Alternatively, an ink or pigment may be added during the manufacture of the film such that all or at least part of the water-soluble film is colored.

The chemical and mechanical properties of a water-soluble film, including but not limited to the dissolution rate of the film, the water vapor transmission rate of the film, and the tensile strength of the film, can be affected by characteristics of the components forming the film, for example, the different components used and the relative amounts of components. As used herein, 'components' means the different ingredients used to form a water-soluble film, including, but not limited to, polymeric resins and/or blends thereof, and plasticizers. Characteristics of the polymeric resins and/or blends thereof, including but not limited to, the degree of crystallinity, the degree of hydrolysis, and the molecular weight of the polymer, can affect the chemical and mechanical properties of the water-soluble film.

Known polyvinyl alcohol (PVOH) polymeric resins and/or blends thereof must balance the degree of hydrolysis and the molecular weight to form water-soluble films which exhibit suitable barrier properties and water solubility. However, such balancing may be difficult. For example, increasing the degree of hydrolysis of a polyvinyl alcohol (PVOH) polymeric resin and/or blend thereof to improve the tensile strength and the barrier properties may cause an increase in the crystallinity and a decrease in solubility. For example, increasing the molecular weight of a polyvinyl alcohol (PVOH) polymeric resin and/or blend thereof to improve solubility may cause a decrease in the tensile strength of the film.

The different components that form water-soluble films of the present invention and the relative amounts of the components are further described hereinafter.

Polyvinyl Alcohol (PVOH) Polymeric Resin

Each of the first water-soluble film and the second water-soluble film may comprise a polyvinyl alcohol (PVOH) polymeric resin and/or blend thereof. More specifically, the polyvinyl alcohol (PVOH) polymeric resin and/or blend thereof of the present disclosure may comprise polyvinyl alcohol (PVOH) homopolymers (e.g., including substantially only vinyl alcohol units and optionally vinyl acetate monomer units). Further, the polyvinyl alcohol (PVOH) polymeric resin and/or blend thereof of the present disclosure may optionally comprise polyvinyl alcohol (PVOH) copolymers (e.g., including one or more other monomer units in addition to vinyl alcohol and optionally vinyl acetate units).

Polyvinyl alcohols (PVOH) are synthetic resins generally prepared by the alcoholysis, usually termed hydrolysis or saponification, of polyvinyl acetate. Fully hydrolyzed polyvinyl alcohol (PVOH), wherein virtually all the acetate groups have been converted to alcohol groups, is a strongly hydrogen-bonded, highly crystalline polymer which dissolves, or is soluble, only in hot water (i.e., temperatures greater than about 60° C.). To dissolve, or to be soluble, in water temperatures lower than hot water temperatures, the polyvinyl alcohol (PVOH) must be partially hydrolyzed. Partially hydrolyzed polyvinyl alcohol (PVOH) occurs when a sufficient number of acetate groups remain after the hydrolysis of polyvinyl acetate. Partially hydrolyzed polyvinyl alcohol (PVOH) results in a more weakly hydrogen-bonded, less crystalline polymer, which may readily dissolve in warm water (i.e., temperatures of from between about 15° C. and about 60° C.) and may dissolve in cold water (i.e., temperatures less than about 15° C.). An intermediate cold or hot water-soluble film can include, for example, intermediate partially-hydrolyzed polyvinyl alcohol (PVOH) (e.g., with degrees of hydrolysis of from about 94% to about 98%), and may be readily soluble only in warm water of temperatures of greater than about 40° C. and less than about 60° C. Both fully and partially hydrolyzed polyvinyl alcohol (PVOH) types are commonly referred to as polyvinyl alcohol (PVOH) homopolymers although the partially hydrolyzed type is technically a vinyl alcohol-vinyl acetate copolymer, however, for purposes of the present disclosure, partially hydrolyzed polyvinyl alcohol (PVOH) is considered a homopolymer.

As can be appreciated, molecular weights of the polymers can influence the properties of a water-soluble film and can be important for the formation of a water-soluble unit dose article. The one or more extruded layers of the water-soluble films may be formed of polymeric resins and/or blends thereof wherein from about 95% to about 100%, preferably about 99%, more preferably 97%, of the polyvinyl alcohol (PVOH) polymeric resin and/or blend thereof is characterized by having a weight average molecular weight ($\overline{M}_w$) of from about 20,000 Da to about 94,500 Da, preferably from about 25,000 Da to about 90,000 Da, or preferably from about 30,000 Da to about 80,000 Da. For purposes of the present disclosure, when referring to the polymeric resin and/or blend thereof having a "low molecular weight", it is referring to a weight average molecular weight of from about 20,000 Da to about 94,500 Da. Molecular weight can be determined by techniques known in the art.

The one or more extruded layers of the water-soluble films may be formed of polymeric resins and/or blends thereof wherein no more than about 5%, preferably no more than about 3%, more preferably no more than about 1%, of the polyvinyl alcohol (PVOH) polymeric resin and/or blend thereof is characterized by having a weight average molecular weight ($\overline{M}_w$) of greater than about 100,000 Da, preferably about 98,000 Da, more preferably about 95,000 Da. For purposes of the present disclosure, when referring to the polymeric resin and/or blend thereof having a "high molecular weight", it is referring to a weight average molecular weight of greater than about 95,000 Da.

The degree of hydrolysis (DH) of the polyvinyl alcohol (PVOH) polymers included in the water-soluble films of the present disclosure may be in a range of from about 60% to about 99%. As the degree of hydrolysis is reduced, a film made from the resin will have reduced mechanical strength but faster solubility at temperatures below about 20° C. As the degree of hydrolysis increases, a film made from the polymer will tend to be mechanically stronger, and the thermoformability and dissolution, especially at colder wash temperatures, will tend to decrease. The degree of hydrolysis can be determined by techniques known in the art. For example, attenuated total reflectance Fourier transform infrared spectroscopy ("ATR-FTIR") spectroscopy or nuclear magnetic resonance ("NMR") spectroscopy can be used.

The degree of hydrolysis of the polyvinyl alcohol (PVOH) may be chosen such that the water-solubility of the polymer is temperature dependent, and thus the solubility of a film made from the polymer, any compatibilizer polymer, and additional ingredients is also influenced. In one option the water-soluble film is a cold water-soluble film. A cold water-soluble film, e.g., soluble in water as low as about 5° C. and/or up to about 10° C. or about 15° C., can include polyvinyl alcohols (PVOH) characterized by having a degree of hydrolysis in a range of from about 75% to about 90%, or in a range of from about 80% to about 90%, or in a range of from about 85% to about 90%, or in a range of from about 87% to about 90%. In another option the water-soluble film is a hot water-soluble film. A hot water-soluble film, e.g., soluble in water temperatures greater than about 60°, can include polyvinyl alcohols (PVOH) characterized by having a degree of hydrolysis of at least about 98%.

Polyvinyl alcohol (PVOH) polymeric resins and/or blends thereof for use in the water-soluble films described herein can be characterized in terms of their viscosities. Polyvinyl alcohol (PVOH) polymeric resins and/or blends thereof for use in the water-soluble films described herein can be characterized by having a viscosity in a range of from about 3 cP to about 40 cP, or from about 5 cP to about 30 cP, for example, at a 4% soluble viscosity at 20° C. It is international practice to state the viscosity of 4% aqueous polyvinyl alcohol solutions at 20° C. Polymeric viscosities specified herein in cP should be understood to refer to the viscosity of a 4% aqueous water-soluble polymer solution at 20° C., unless specified otherwise. The viscosity of a polyvinyl alcohol (PVOH) polymeric resin and/or blend thereof, or generally any other polymeric resin and/or blend thereof, may be determined by measuring a freshly made film composition using a Brookfield LV type viscometer with UL adapter as described in British Standard EN ISO 15023-2: 2006 Annex E Brookfield Test method.

The polyvinyl alcohol (PVOH) polymeric resin and/or blend thereof of the present disclosure may preferably comprise polyvinyl alcohol (PVOH) homopolymers (e.g., including substantially only vinyl alcohol units and optionally vinyl acetate monomer units). Polyvinyl alcohol (PVOH) resin blends may comprise a blend of polyvinyl alcohol (PVOH) homopolymers, wherein the polyvinyl alcohol (PVOH) homopolymers are comprised of vinyl alcohol monomer units and vinyl acetate monomer units, however, the polyvinyl alcohol (PVOH) homopolymers having different other characteristics, such as, for example, different degrees of hydrolysis and/or different molecular weights. Preferably, the polyvinyl alcohol (PVOH) polymeric resin and/or blend thereof may comprise at least 50% or more of polyvinyl alcohol (PVOH) homopolymers.

The polyvinyl alcohol (PVOH) polymeric resin and/or blend thereof of the present disclosure may optionally comprise polyvinyl alcohol (PVOH) copolymers (e.g., including one or more other monomer units in addition to vinyl alcohol and optionally vinyl acetate units). For example, the polyvinyl alcohol (PVOH) polymeric resin and/or blend thereof may comprise a polyvinyl alcohol (PVOH) homopolymer which is either completely hydrolyzed polyvinyl alcohol or a partially hydrolyzed combination of poly(vinyl alcohol-co-vinyl acetate) as well as an anionic monomer unit, such as, for example, an anionic monomer unit derived from a carboxylated anionic monomer unit. As used herein, "carboxylated anionic monomer unit" includes the vinyl polymerization units corresponding to monocarboxylic acid vinyl monomers, their esters and anhydrides, dicarboxylic monomers having a polymerizable double bond, their esters and anhydrides, and salts, preferably alkali metal salts, of any of the foregoing. Examples of anionic monomer units include the vinyl polymerization units corresponding to vinyl anionic monomers including vinyl acetic acid, maleic acid, monoalkyl maleate, dialkyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations thereof (e.g., multiple types of anionic monomers or equivalent forms of the same anionic monomer). The one or more anionic monomer units may be incorporated or present in the polyvinyl alcohol (PVOH) polymer at a given amount. Typically, as anionic monomer content increases, so does solubility of the polyvinyl alcohol (PVOH) polymer resin, resin blends, and/or films made from such resins or resin blends. Films that include polyvinyl alcohol (PVOH) polymers having higher anionic monomer contents also may have relatively greater tackiness, which may be indicative of greater sealability. However, a water-soluble film where the relative tackiness is too high may not be desired due to challenges converting tacky films into water-soluble unit dose articles during manufacture.

Alternatively or additionally, the polyvinyl alcohol (PVOH) polymeric resin and/or blends thereof, the water-soluble film, or both can be characterized as being free or substantially free from other polymers (e.g., other water-soluble polymers generally, other polyvinyl alcohol (PVOH)-based polymers specifically, or both). The water-soluble film may include one or more additional water-soluble polymers.

The polyvinyl alcohol (PVOH) polymeric resin and/or blend thereof can be included in the film in an amount in a range of from about 50% to about 95%, preferably from about 60% to about 90%, more preferably from about 70% to about 80%, by weight of the water-soluble film. In the present disclosure, each of the first water-soluble film and the second water-soluble film may independently comprise from about 50% to about 95%, preferably from about 60% to about 90%, more preferably from about 70% to about 80%, by weight of the water-soluble film, of the polyvinyl alcohol (PVOH) polymeric resin and/or blend thereof.

Plasticizers

In addition to the polyvinyl alcohol (PVOH) polymeric resin and/or blends thereof, the water-soluble films may comprise one or more plasticizers. One or more plasticizers may be added to the polymeric resin and/or blend thereof during the film-forming process to improve the rheological properties of the water-soluble film formed. A plasticizer can improve the flexibility and plasticity of the water-soluble film. During the extrusion process, one or more plasticizers may be added to the polymeric resin and/or blend thereof to adjust the rheological properties of the polymeric resin and/or blend thereof as the polymeric resin and/or blend thereof moves through the extrusion process. The extrusion process is further described hereinafter. The specific amounts of the one or more plasticizers can be selected based on desired film flexibility and processability features of the water-soluble film. At lower plasticizer levels, the film may become brittle, difficult to process, or prone to breaking. At more elevated plasticizer levels, the film may be too soft, weak, or difficult to process for a desired use.

The one or more plasticizers can be included in the water-soluble film in an amount in a range of from about 5% to about 50%, preferably from about 10% to about 40%, more preferably from about 15% to about 30%, by weight of the water-soluble film. In the present disclosure, each of the first water-soluble film and the second water-soluble film may independently comprise from about 5% to about 50%, preferably from about 10% to about 40%, more preferably from about 15% to about 30%, by weight of the water-soluble film, of one or more plasticizers. It is to be understood that during the extrusion process, certain quantities of water may be added to the polymeric resin and/or blend thereof and plasticizer components, however, it is not contemplated that any water added during the extrusion process is considered calculated as the percent of plasticizer, by weight of the water-soluble film, as is disclosed. Thus, although water may be considered a plasticizer, for purposes of this application, any amount of plasticizer calculated may include water as a plasticizer when water is an additive purposefully added to the polymeric resin and/or blend thereof before extruding the components rather than any water added to the components during the extrusion process. In already formed film, the amount of plasticizer can be verified using techniques known in the art. For example, the amount of glycerin can be determined through use of a gas chromatography with a flame ionization detector ("GC-FID"). In such methods, ethanol can be used to extract glycerin from a small portion of the water-soluble film or resin. The quantity of glycerin can be determined by comparing to a known commercial glycerin material. As can be appreciated, other processes can be used to determine the quantity of other types of plasticizers including, for example, time of flight mass spectroscopy ("MALDI-TOF MS"), and Raman spectroscopy.

The one or more plasticizers may be selected from the group consisting of 2-methyl-1,3-propanediol, alkyl citrate, diethylene glycol, diglycerin, dipropylene glycol, ethanolamines, ethylene glycol, glucamine, glycerin, hexylene glycol, isosorbide, neopentyl glycol, N-methylglucamine, pentaerythritol, polyether polyols, polyethylene glycol, polypropyl glycol, propylene glycol, sodiumcumenesulfonate, sorbitol, tetraethylene glycol, triethylene glycol, trimethylolpropane, water, and mixtures thereof. As can be appreciated, other plasticizers can also be suitable including vegetable oil, polysorbitols, polyethylene oxide, dimethicone, mineral oil, paraffin, $C_1$-$C_3$ alcohols, dimethyl sulfoxide, N, N-dimethylacetamide, sucrose, corn syrup, fructose, dioctyl sodium-sulfosuccinate, triethyl citrate, tributyl citrate, mono, di- or triacetates of glycerin, natural gums, citrates, and mixtures thereof. Preferably, the plasticizer is selected from the group consisting of sorbitol, glycerol, and mixtures thereof. As discussed above, with regards to the term plasticizer, it is to be understood to include such additives purposefully added to the polymeric resin and/or blend thereof before extruding the components.

In a non-limiting example, the water-soluble film may comprise at least about 10%, by weight of the water-soluble film, of glycerol. In a non-limiting example, the water-soluble film may comprise at least about 5%, by weight of the water-soluble film, of glycerol. In a non-limiting example, the water-soluble film may comprise from about 5% to about 20%, by weight of the water-soluble film, of glycerol and from about 5% to about 15%, by weight of the water-soluble film, of sorbitol.

The weight ratio of the amount of the polyvinyl alcohol (PVOH) polymeric resin and/or blend thereof as compared to the amount of plasticizer can be from about 4:1 to about 3:1. The specific amounts of plasticizers and other non-polymer component can be selected in a particular embodiment based on an intended application of the water-soluble film to adjust film flexibility and to impart processing benefits in view of desired mechanical film properties.

Auxiliary Film Components

In addition to the polyvinyl alcohol (PVOH) polymeric resins and/or blends thereof and the plasticizers described above, the water-soluble films of the present disclosure may include other auxiliary components. The specific amounts of such other components can be selected based on the intended application of the water-soluble film in order to adjust film flexibility and to impart processing benefits in view of desired mechanical film properties. When included, such components can be blended with the polyvinyl alcohol (PVOH) polymeric resin and/or blend thereof and the plasticizer before formation of the water-soluble film. Alternatively or additionally, certain components (e.g., aversive agents) can be added to the water-soluble film or to the water-soluble unit dose article once formed, for example, added by dusting, printing, spraying, or otherwise coating. As can be appreciated, any of the various water-soluble films described herein can be tailored by including a selection of such auxiliary components. In certain examples wherein there is a water-soluble multilayer film composite, any of the optional auxiliary components can be included only in certain layers or can be included in each of the layers. For example, in certain examples, an aversive agent can be included only in layers likely to be contacted by humans.

The water-soluble film may comprise other auxiliary agents and processing agents, such as, but not limited to, aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), cross-linking agents, antiblocking agents, antifoams, antioxidants, bleaching agents (e.g., sodium metabisulfite, sodium bisulfite or others), detackifying agents, extenders, fillers, lubricants, plasticizer compatibilizers, release agents, surfactants, gas-barrier additives (e.g., nanoparticles such as layered silicate-type nanoclays such as sodium montmorillonite), and other functional ingredients, in amounts suitable for their intended purposes.

Each of the first water-soluble film and the second water-soluble film may independently further comprise one or more components selected from the group consisting of aversive agents, cross-linking agents, antiblocking agents, detackifying agents, extenders, fillers, lubricants, release agents, surfactants, gas-barrier additives and combinations thereof. The amount of such agents can be up to about 50 wt. %, 20 wt. %, 15 wt. %, 10 wt. %, 5 wt. %, 4 wt. % and/or at least 0.01 wt. %, 0.1 wt %, 1 wt %, or 5 wt %, individually or collectively, by weight of the water-soluble film.

Suitable surfactants may include, but are not limited to, the nonionic, cationic, anionic and zwitterionic classes. Suitable surfactants may include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants may include, but are not limited to, dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. The amount of surfactant in the water-soluble film may be in a range of from about 0.1 wt. % to about 2.5 wt %, preferably from about 1.0 wt. % to 2.0 wt. % by weight of the water-soluble film.

Suitable lubricants/release agents may include, but are not limited to, fatty acids and their salts, fatty alcohols, fatty esters, fatty amines, fatty amine acetates and fatty amides. Preferred lubricants/release agents are fatty acids, fatty acid salts, and fatty amine acetates. The amount of lubricant/release agent in the water-soluble film may be in a range of from about 0.02 wt. % to about 1.5 wt. %, optionally about 0.1 wt. % to about 1 wt. % by weight of the water-soluble film.

The water-soluble film may include an aversive agent. Preferably, the aversive agent is a bittering agent. The aversive agent may comprise denatonium benzoate and/or a derivative thereof. The aversive agent may be mixed with the polymeric material and/or other adjuncts prior to making the film (e.g., prior to casting or extruding the film). Alternatively or additionally, the aversive agent may be added to the film or to the unit dose article once formed, for example, added by dusting, printing, spraying, or otherwise coating.

The water-soluble film may include a gas-barrier additive to further improve the barrier properties of the film. Generally, suitable gas-barrier additives can include any compound, or polymers, compatible with the water-soluble film which improves the film's barrier properties. For example, suitable gas-barrier additives can include nanoclays, cellulose nano-fibrils, cellulose nano-crystals, talc, graphene, and polymers such as chitin, cellulose, starch, soy, whey, and gluten. An example of a suitable nanoclay is methyl-bis (hydroxyethyl)octadecyl ammonium surface compatabilized montmorillonite clay. Gas-barrier additives can be added in any suitable manner. For example, the gas-barrier additive can be blended into the polyvinyl alcohol (PVOH) polymeric resin and/or blend thereof and then thoroughly dispersed to exfoliate the additive. When included, a gas-barrier additive can be added at any suitable quantity that does not cause determents to the water-soluble film. For example, a gas-barrier additive can be included, by weight of the water-soluble film, at about 0.1% to about 5%, at about 0.5% to about 4%, at about 1% to about 3%, and at about 2%. As can be further appreciated, it can be useful to include the gas-barrier additive only in certain water-soluble film layers of a water-soluble multilayer film composite. For example, in certain water-soluble multilayer film composites, it can be useful to include a gas-barrier additive only in the inner layers of the water-soluble film. Including the gas-barrier additive in the inner core layers can minimize any detriments caused by the gas-barrier additive such as the sealing properties of the water-soluble film. As can be appreciated, certain gas barrier additives may have no effect on sealing properties and can be included in any layer of an extruded water-soluble film.

Suitable fillers/extenders/antiblocking agents/detackifying/cross-linking agents may include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. The amount of filler/extender/antiblocking agent/detackifying agent in the water-soluble film may be in a range of from about 0.1 wt. % to about 25 wt. %, or about 1 wt. % to about 10 wt. %, or about 2 wt. % to about 8 wt. %, or about 3 wt. % to about 5 wt. %, by weight of the water-soluble film. In the absence of starch, a preferred range for a suitable filler/extender/antiblocking agent/detackifying agent is from about 0.1 wt. % or 1 wt. % to about 4 wt. % or 6 wt. %, or from about 1 wt. % to about 4 wt. %, or from about 1 wt. % to about 2.5 wt. %.

Water-soluble materials can be included to provide various benefits to the film as known in the art. For example, the polyvinyl alcohol (PVOH) polymeric resin and/or blend thereof described herein can be blended with one or more additional water-soluble polymers or immiscible phase-forming additives to provide a beneficial mix of properties.

Examples of suitable water-soluble materials can include, but are not limited to, polyethylene oxide polymers, butene diol alcohol (BVOH) copolymers, polyvinyl pyrrolidone, acrylamide, acrylic acid, polyvinyl alcohols and derivatives thereof, cellulose, cellulose, cellulose ethers, cellulose esters, cellulose amides, polyvinyl acetates, polycarboxylic acids and salts, polyaminoacids or peptides, polyamides, polyalkylene oxides, polyethyleneimines, polyacrylamide, copolymers of maleic/acrylic acids, polysaccharides including starch, modified starches, ethoxylated starches, carboxymethylated starches, sulfonated starches, gelatins, natural gums such as xanthum gum and carragum, polyacrylates and water-soluble acrylate copolymers, polymethacrylates, methylcellulose, carboxymethylcellulose and salts thereof, hydroxyethyl cellulose, hydroxypropyl methylcellulose, dextrin, maltodextrin, copolymers thereof, blends thereof, salts thereof, and combinations thereof. When additional water-soluble polymers are included, it can be advantageous to select polymers with similar molecular weights to improve the compatibility of the polymer with the BVOH copolymer. In embodiments including water-soluble materials, such materials can be included, by weight of the water-soluble film, at levels of from about 0.1% to about 20% in certain examples.

Household Care Compositions

The water-soluble unit dose article may comprise one or more household care compositions contained within one or more compartments within the water-soluble unit dose article. Household care compositions may be in the form of free-flowing powder, a liquid, a compacted solid, a gel or a mixture thereof. In a multi-compartment unit-dose article, each compartment may independently contain a household care composition in a form selected from the group consisting of a free-flowing powder, a liquid, a compacted solid, a gel, and mixtures thereof. Preferably, the household care composition is in the form of a liquid. In multi-compartment water-soluble unit dose articles having two compartments (one compartment containing a first composition and the other compartment containing a second composition), the first composition and the second composition may be selected from one of the following combinations: liquid, liquid; liquid, powder; powder, powder; and powder, liquid. In multi-compartment water-soluble unit dose articles having three compartments (one compartment containing a first composition, another compartment containing a second composition, and a third compartment containing a third composition), the first, second and third compositions may be selected from one of the following combinations: solid, liquid, liquid; liquid, liquid, liquid; liquid, solid, liquid; solid, solid, liquid; solid, solid, solid.

The household care composition may be in the form of a free-flowing powder. Such a free-flowing powder may have an average particle size diameter of from about 100 μm to about 1500 μm, preferably from about 100 μm to about 1000

μm, more preferably from about 100 μm to about 750 μm. Those skilled in the art will be aware of standard techniques to measure particle size.

The household care composition may be a liquid. As mentioned above, in relation to household care compositions of the present invention, a "liquid" includes free-flowing liquids, as well as pastes, gels, foams and mousses. The liquid composition may also include gases in suitably subdivided form. However, the liquid composition excludes forms which are non-liquid overall, such as tablets or granules.

The household care composition may be a liquid laundry detergent composition. The term "liquid laundry detergent composition" refers to any laundry detergent composition comprising a liquid capable of wetting and treating fabric e.g., cleaning clothing in a domestic washing machine. The laundry detergent composition is used during the main wash process but may also be used as pre-treatment or soaking compositions. Laundry detergent compositions include fabric detergents, fabric softeners, 2-in-1 detergent and softening, pre-treatment compositions and the like. The household care composition, preferably a laundry detergent composition, may comprise an ingredient selected from the group consisting of bleach, bleach catalyst, dye, hueing dye, brightener, cleaning polymers including alkoxylated polyamines and polyethyleneimines, soil release polymer, surfactant, solvent, dye transfer inhibitors, chelant, builder, enzyme, perfume, encapsulated perfume, polycarboxylates, rheology modifiers, structurant, hydrotropes, pigments and dyes, opacifiers, preservatives, anti-oxidants, processing aids, conditioning polymers including cationic polymers, antibacterial agents, pH trimming agents such as hydroxides and alkanolamines, suds suppressors, and mixtures thereof.

Surfactants can be selected from anionic, cationic, zwitterionic, non-ionic, amphoteric or mixtures thereof. Preferably, the household care composition comprises anionic, non-ionic or mixtures thereof. The anionic surfactant may be selected from linear alkyl benzene sulfonate, alkyl ethoxylate sulphate and combinations thereof.

Suitable anionic surfactants useful herein may comprise any of the conventional anionic surfactant types typically used in liquid detergent products. These may include the alkyl benzene sulfonic acids and their salts as well as alkoxylated or non-alkoxylated alkyl sulfate materials.

The non-ionic surfactant may be selected from fatty alcohol alkoxylate, an oxo-synthesised fatty alcohol alkoxylate, Guerbet alcohol alkoxylates, alkyl phenol alcohol alkoxylates or a mixture thereof. Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to about 15 carbon atoms, or from about 10 to about 14 carbon atoms. In one aspect, the alkoxylated fatty alcohols will also be ethoxylated materials that contain on average from about 2 to 12 ethylene oxide moieties per molecule, or from about 3 to about 10 ethylene oxide moieties per molecule.

The shading dyes employed in the present household care compositions may comprise polymeric or non-polymeric dyes, pigments, or mixtures thereof. Preferably the shading dye comprises a polymeric dye, comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Although any suitable chromophore may be used, the dye chromophore is preferably selected from benzodifuranes, methine, triphenylmethanes, napthalimides, pyrazole, napthoquinone, anthraquinone, azo, oxazine, azine, xanthene, triphenodioxazine and phthalocyanine dye chromophores. Mono and di-azo dye chromophores are preferred.

The dye may be introduced into the detergent composition in the form of the unpurified mixture that is the direct result of an organic synthesis route. In addition to the dye polymer therefore, there may also be present minor amounts of un-reacted starting materials, products of side reactions and mixtures of the dye polymers comprising different chain lengths of the repeating units, as would be expected to result from any polymerisation step.

The household care composition may comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

The household care composition of the present invention may comprise one or more bleaching agents. Suitable bleaching agents, other than bleaching catalysts, include photobleaches, bleach activators, hydrogen peroxide, sources of hydrogen peroxide, pre-formed peracids and mixtures thereof. In general, when a bleaching agent is used, the compositions can include from about 0.1% to about 50%, or from about 0.1% to about 25%, bleaching agent by weight of the subject cleaning composition.

The household care composition may comprise a brightener. Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

The household care composition of the present invention may also optionally contain one or more copper, iron and/or manganese chelating agents. The chelant may comprise 1-hydroxyethanediphosphonic acid (HEDP) and salts thereof; N,N-dicarboxymethyl-2-aminopentane-1,5-dioic acid and salts thereof; 2-phosphonobutane-1,2,4-tricarboxylic acid and salts thereof; and any combination thereof. f included, chelating agents can generally be included at levels of from about 0.1% by weight of the compositions herein to about 15% by weight. In certain examples, chelating agents can be included at about 3.0% to about 15% by weight of the compositions herein.

The household care composition of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When included in the compositions, the dye transfer inhibiting agents can be present at levels, by weight of the compositions, of from about 0.0001%, from about 0.01%, from about 0.05% to about 10%, about 2%, and about 1%.

The household care composition may comprise one or more polymers. Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Suitable cellulosic polymers may have a degree of substitution (DS) of from 0.01 to 0.99 and a degree of blockiness (DB) such that either DS+DB is of at least 1.00 or $DB+2DS-DS^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose. Another suitable cellulosic polymer is cationically modified hydroxyethyl cellulose.

The household care composition may comprise one or more perfumes and/or perfume microcapsules. Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

The household care composition may comprise one or more suds suppressors. Suitable suds suppressors include silicone and/or fatty acid such as stearic acid.

The household care composition may be coloured. The color of the household care composition may be the same or different to any printed area on the film of the water-soluble unit. Each compartment of the water-soluble unit dose article may have a different color. Preferably, the household care composition comprises a non-substantive dye having an average degree of alkoxylation of at least 16.

The household care compositions films described herein may have any suitable viscosity depending on factors such as formulated ingredients and purpose of the composition. The household composition may have a high shear viscosity value, at a shear rate of 20 $s^{-1}$ and a temperature of 20° C., of 100 to 3,000 cP, alternatively 300 to 2,000 cP, alternatively 500 to 1,000 cP, and a low shear viscosity value, at a shear rate of 1 $s^{-1}$ and a temperature of 20° C., of 500 to 100,000 cP, alternatively 1000 to 10,000 cP, alternatively 1,300 to 5,000 cP. Methods to measure viscosity are known in the art. Viscosity measurements of household care compositions may be carried out using a rotational rheometer e.g. TA instruments AR550. The instrument includes a 40 mm 2° or 1° cone fixture with a gap of around 50-60 μm for isotropic liquids, or a 40 mm flat steel plate with a gap of 1000 μm for particles containing liquids. The measurement is carried out using a flow procedure that contains a conditioning step, a peak hold and a continuous ramp step. The conditioning step involves the setting of the measurement temperature at 20° C., a pre-shear of 10 seconds at a shear rate of 10 $s^{-1}$, and an equilibration of 60 seconds at the selected temperature. The peak hold involves applying a shear rate of 0.05 $s^{-1}$ at 20° C. for 3 min with sampling every 10 s. The continuous ramp step is performed at a shear rate from 0.1 to 1200 $s^{-1}$ for 3 min at 20° C. to obtain the full flow profile.

At least one compartment of the water-soluble unit dose article may comprise a solid. If present, the solid may be present at a concentration of at least 5% by weight of the unit dose article.

Those skilled in the art will be aware of processes to make the household care composition of the present invention. Those skilled in the art will be aware of standard processes and equipment to make the household care compositions.

Method of Making a Water-Soluble Film

The water-soluble films of the present disclosure are formed via extrusion processes, such as cast extrusion processes and blown extrusion processes. Extrusion processes can provide a number of advantages over alternative processes such as solution casting. It is known that the process by which a water-soluble film is formed may affect the water-soluble film's chemical and mechanical properties. Extrusion processes offer greater ease in formulation when compared with solution cast processes in forming water-soluble films of the present invention.

The extrusion process may be performed by any such extrusion process known to one skilled in the art. Such extrusion processes may include, but are not limited to, hot extrusion, cold extrusion, warm extrusion, cast extrusion and blown extrusion. The extrusion process normally begins by heating the water-soluble film material (here, the polyvinyl alcohol (PVOH) polymeric resins and/or blends thereof, one or more plasticizers, and any other adjunct ingredients) to form a homogenous melt. The melting and homogenizing of the materials may be performed by a heating component and an extruder screw. This melt may then loaded into a container in a press. A block is placed such that the block may place pressure on the melted material to push the material out of a die. The extruded material is then stretched by elongation rollers while the material is still hot to predetermined thickness and sizing dimensions. The resulting film is then cooled, cut, and packaged.

The water-soluble multilayer film composite may be coextruded. Coextrusion is particularly useful in forming water-soluble multilayer film composites. Coextrusion entails extruding two or more materials through the same die to produce a single piece, here, a water-soluble multilayer film composite. Each layer of film may exhibit different properties as the materials by which each film is formed may be chemically different.

Formulating water-soluble films having both good dissolution profiles and good tensile strength may prove challenging to formulators. Polymeric resins and/or blends thereof having lower molecular weights and degrees of hydrolysis exhibit better dissolution profiles but poor film strength (e.g., breakage during manufacture, breakage during thermoforming, leakage of resulting article). Higher molecular weight polymeric resins and/or blends thereof exhibit better film strength but poor dissolution profiles. Formulators would have to include a higher plasticizer content to make the composition formed from higher molecular weight polymeric resins and/or blends thereof become less crystalline and more amorphous as to improve dissolution. However, incorporating plasticizers with higher molecular weight polymeric resins and/or blends thereof may separate the polymer chain and penetrate into the structure of the polymer, resulting in better dissolution but weakening the strength of the film. Thus, to form films having both good dissolution profiles and film strength, formulators generally resort to forming more complex formulations comprising mixtures of lower molecular weight polymeric resins and/or blends thereof and higher molecular weight polymeric resins and/or blends thereof.

The water-soluble films of the present invention are extruded rather than solution cast for a number of reasons. Solution cast film processes include the addition of water throughout the process. In solution casting, the polymeric resin and/or blends thereof are dissolved in a solution, typically including plasticizers, and dissolved in a solvent, such as water or ethanol. The resulting solution is then spread out onto a continuous roll of release media, such as plastic impregnated paper, typically using a doctor blade The coated media is passed through a drying apparatus such as an oven to dry off the solvents, leaving a resulting film to be cut and formed into water-soluble unit dose articles.

Formulators must take into account the additional water, which acts as a plasticizer, when creating the initial formulation. As described above, plasticizer content may adversely affect the resulting film. Extrusion processes do not typically require the use of water throughout the process. Further, extrusion processes can offer improvements to both the ease of manufacturing and the cost compared to other processing methods. Thus, extrusion processes are simpler when formulating the initial film composition as extrusion processes do not require the step(s) of accounting for added water content during the process.

Solution cast processes may take longer than extrusion processes. Extruding films is generally a quicker process when compared with solution casting films. Solution casting needs a viscosity low enough to be able to move the composition underneath a doctor blade onto a belt. Water is generally added and then the formed film needs some time to dry in a controlled fashion. Extrusion processes do not require use of a doctor blade to move and form the film, thus not requiring this extra step of incorporating water and requiring time for the resulting film to dry. Thus, more films can be produced by extruding the films within the same time frame as by solution casting the films.

In addition, certain polyvinyl alcohol (PVOH) polymers and copolymers described herein can exhibit a relatively large temperature difference between the melting temperature and the decomposition temperature. This difference can facilitate the use of extrusion processes by minimizing product loss to thermal decomposition, generally resulting in greater ease in determining formulation as compared to solution cast processes.

Extruded films are, however, limited by the rheological properties of the materials forming the film. To extrude materials into films, formulators must optimize processes depending on the particular molecular weight of the polymeric resin and/or blends thereof desired to be used. Optimizing the process to work for the particular molecular weight may prove tricky. For polymeric resins requiring higher viscosities, formulators may increase the viscosity by adding rheology modifiers. However, the inclusion of rheology modifiers is more technically complex and there may arise compatibility issues among the plasticizers, the polymeric resin, and/or the rheology modifiers. Formulators may alternatively, or in addition to, decrease the temperature of the process. However, decreasing the temperature may lead to the materials not fully melting. When the materials do not fully melt, pinholes or small pockets from unmelted polymeric resin may form, resulting in tears in the film once the film is extruded and stretched. In addition, when materials do not fully melt, there may be inconsistent thickness, or caliper, throughout the film formed. For polymeric resins requiring lower viscosities, formulators may decrease the viscosity by adding rheology modifiers. Again, the inclusion of rheology modifiers is more technically complex and there may arise compatibility issues among the plasticizers, the polymeric resin, and/or the rheology modifiers. Formulators may alternatively, or in addition to, increase the temperature of the process. However, increasing the temperature of the process may result in polymer degradation and poor film quality.

However, it has been found that water-soluble films of the present invention, formed by polyvinyl alcohol (PVOH) polymeric resins and/or blends thereof, plasticizers, and other adjunct components, may be readily extruded and are less likely to encounter the issues mentioned above. It is believed that the carefully selected molecular weight ranges of the polymers and the ratios in which the polymeric resins and/or blends thereof and the carefully selected plasticizers enable water-soluble films of good dissolution and tensile strength to be produced without the technical complexity of incorporating rheological modifiers and/or adjusting temperature profiles. It is believed that the carefully selected molecular weight ranges of the polymers and the ratios in which the polymeric resins and/or blends thereof are within a range that are low enough to provide good dissolution while being high enough to provide good tensile strength, when extruded.

Additionally, extrusion processes can facilitate the inclusion of additional components such as additional resins and gas-barrier additives, and can facilitate the formation of multiple layers of film, the multiple layers of film forming a water-soluble multilayer film composite. Extrusion processes can also be used to extrude compositions that phase separate. Solution cast films would entail formulators creating a much more technically complex formulation as to incorporate the various desired properties within one layer of film.

Certain water-soluble films described herein can be a single-layer film formed from the polyvinyl alcohol (PVOH) polymeric resin and/or blend thereof described herein. In such embodiments, the single-layer film can generally be formed at any suitable thickness which demonstrates suitable barrier properties and solubility. Alternatively, the water-soluble films described herein can be formed as water-soluble multilayer film composite including one or more layers formed from the polyvinyl alcohol (PVOH) polymeric resin and/or blend thereof described herein. Generally, multilayer films can be formed in any suitable way. For example, multilayer films may be co-extruded as known in the art.

As can be appreciated, many water-soluble multilayer film composite variations are possible. For example, at least one of the layers may be formed of a first polyvinyl alcohol (PVOH) polymeric resin and/or blend thereof having a first molecular weight and at least another of the layers may be formed of a second polyvinyl alcohol (PVOH) polymeric resin and/or blend thereof having a second molecular weight, wherein the only difference between the two layers is the molecular weight of the polyvinyl alcohol (PVOH) homopolymer used, the at least two layers together forming a water-soluble multilayer film composite. The use of a single polyvinyl alcohol (PVOH) homopolymer to form each layer can be useful to minimize compatibility issues between polymers having different characteristics, such as different molecular weights, when the layers are in contact with one another. Alternatively, at least one of the layers may be formed of a first polyvinyl alcohol (PVOH) polymeric resin and/or blend thereof and at least another of the layers may be formed of a second polyvinyl alcohol (PVOH) polymeric resin and/or blend thereof, wherein each polyvinyl alcohol (PVOH) polymeric resin and/or blend thereof is composed of different polyvinyl alcohol (PVOH) polymers and/or copolymers, the at least two layers together forming a water-soluble multilayer film composite. As discussed above, the use of water-soluble film layers formed of different polyvinyl alcohol (PVOH) polymeric resins and/or blends thereof can allow for water-soluble multilayer film composites having two or more different properties to more readily be formed by combining the different, separate layers, rather than attempting to blend multi polymeric resins together within a single layer film. It can be imagined that any combination of layers each layer having the same and/or different properties as any other layer can be combined to form a water-soluble multilayer film composite.

The number of layers of a water-soluble multilayer film composite can vary. For example, various water-soluble films can be formed of 3 layers, formed of 5 layers, formed of 7 layers, formed of 9 layers, or formed of more than 9 layers.

Method of Making a Water-Soluble Unit Dose Article

The present invention further relates to a method of making a water-soluble unit dose article. The method of making a water-soluble unit dose article may comprise the steps of: extruding one or more layers of a first water-soluble film; extruding one or more layers of a second water-soluble film; shaping the first water-soluble film to form an open compartment; providing a household care composition; loading the open compartment with the household care composition; and sealing the open compartment with the second water-soluble film to form a water-soluble unit dose article having a sealed compartment having the household care composition enclosed therein. The method may comprise the step of sealing the open compartment with at least a second sealed compartment, such that the water-soluble unit dose article formed by the method is a multi-compartment water-soluble unit dose article having superposed compartments.

Water-soluble unit dose articles of the present invention may be made by a number of methods. Those skilled in the art will be aware of standard techniques to make the water-soluble unit dose article according to any aspect of the present invention. Standard shaping, or forming, processes including but not limited to thermoforming and vacuum forming techniques may be used. "Thermoforming" herein means the process of heating the film, shaping it in a mold, and then allowing the film to cool, whereupon the film will hold the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. The film may be heated using an infrared light. The film may be heated to a temperature of from about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

A preferred method of making the water-soluble unit dose article according to the present invention may comprise the steps of molding the first water-soluble film in a mold to form an open cavity, the open cavity being the open compartment, filling the compartment with the household care composition, laying a second water-soluble film over the first water-soluble film to close the compartment, and sealing the first water-soluble film and the second water-soluble film together to form the water-soluble unit dose article. Household care compositions may be provided to the open compartment(s) by any suitable filling nozzle. The filling of the molded film compartments can be accomplished by utilizing any suitable means. The most preferred method will depend on the product form and required speed of filling. The molded film may be filled by in-line filling techniques.

The filled, open compartment is then sealed closed to form water-soluble unit dose articles having sealed compartments with the household care composition enclosed therein by any suitable method, for example by using a second film. This may be accomplished while in horizontal position and in continuous, constant motion. The closing may be accomplished by continuously feeding a second film, preferably water-soluble film, over and onto the open compartments and then preferably sealing the first and second film together, typically in the area between the molds and thus between the compartments.

Suitable sealing methods can include heat sealing, solvent sealing or welding, pressure sealing, ultrasonic sealing, pressure sealing, laser sealing, impulse sealing, infrared ("IR") sealing or a combination thereof. For example, water or another suitable aqueous solvent can be applied to an edge to partially dissolve the water-soluble film allowing a seal to be formed. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed water-soluble unit dose articles may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

Water-soluble unit dose articles may be made according to a process comprising the steps of: step (a) extruding one or more layers of a first water-soluble film; (b) extruding one or more layers of a second water-soluble film; (c) extruding one or more layers of a third water-soluble film; after step (a), then step (d) shaping the first water-soluble film optionally using heat and/or vacuum, on a first forming machine to form a first open compartment; (e) providing a first household care composition; after step (e) then step (f) loading the first open compartment with the first household care composition; (g) shaping the second water-soluble film optionally using heat and/or vacuum on a second forming machine to form a second open compartment; (h) providing a second household care composition; after step (h) then step (i) loading the second open compartment with the second household care composition; after step (i) then step (j) sealing the second open compartment with the third water-soluble film to form a second closed compartment; after step (j) then step (k) superposing the second closed compartment over the first open compartment such that the third water-soluble film is in contact with the first water-soluble film; after step (k) then step (l) sealing the first open compartment with the second closed compartment by sealing the third water-soluble film and the first water-soluble film; after step (l), then step (m) cutting the films to produce a multi-compartment water-soluble unit dose article. It is contemplated that any number of compartments may be formed using any number of forming machines, or that multiple compartments may be simultaneously formed on the same forming machine.

The first and second forming machines may be selected based on their suitability to perform the above process. The first forming machine may be a horizontal forming machine, and the second forming machine may be a rotary drum forming machine, for example located above the first forming machine.

It should be understood that by the use of appropriate feed stations, it may be possible to manufacture multi-compartment water-soluble unit dose articles incorporating a number of different or distinctive compositions and/or different or distinctive liquid, gel or paste compositions.

The molds, in which water-soluble unit dose articles can be made, can have any shape, length, width and depth, depending on the required dimensions of the water-soluble unit dose article and the compartments contained therein. The molds may also vary in size and shape from one to another, if desirable. For example, the volume of the final water-soluble unit dose article compartments may be from about 5 mL to about 300 mL, or from about 10 mL to about 150 mL, or from about 20 to about 100 mL, and the mold sizes are adjusted accordingly.

Water-soluble unit dose articles may be made using vertical form filling, horizontal form filling, or rotary drum filling techniques commonly known in the art. Such processes may be either continuous or intermittent.

In any example described herein, unit dose articles can be formed in a web process which forms multiple articles at once. After the web is sealed, the web can be cut to form the individual unit dose articles.

In certain examples, a method may further comprise the step of dusting the water-soluble unit dose article with a dusting agent, such as talc, silica, zeolite, carbonate, or a mixture thereof to prevent film blocking.

Method of Treating a Substrate with a Water-Soluble Unit Dose Article

The present invention further relates to a method of treating a substrate with a water-soluble unit dose article according to the present disclosure. The method may comprise the steps of: placing at least one water-soluble unit dose article according to the present disclosure into a washing machine along with laundry to be washed, and carrying out a washing operation. Herein, the substrate is preferably laundry of varying fabrics. More than one water-soluble unit dose article may be used depending upon numerous factors, such as, for example, the soil level of the fabrics to be washed, the amount of laundry to be washed, and so forth.

Any suitable washing machine may be used. Those skilled in the art will recognize suitable machines for the relevant wash operation. The water-soluble unit dose article of the present disclosure may be used in combination with other compositions, such as fabric additives, fabric softeners, rinse aids and the like.

The wash temperature may at a temperature up to about 80° C., or up to about 60° C., or up to about 40° C., or up to about 30° C., or up to about 20° C., or up to about 15° C., or up to about 10° C., or up to about 5° C. The washing operation may comprise at least one wash cycle having a duration of between about 5 and about 20 minutes. The automatic laundry machine may comprise a rotating drum, and wherein during at least one wash cycle, the drum has a rotational speed of between about 15 and about 40 rpm, preferably between about 20 and about 35 rpm. The household care composition contained therein the water-soluble unit dose article may be diluted from about 300 to about 800 fold with water to form a wash liquor.

Test Methods

Tensile Strength Test Method

A water-soluble film characterized by or to be tested for tensile strength according to the Tensile Strength (TS) Test is analyzed as follows. The procedure includes the determination of tensile strength according to ASTM D-882 ("Standard Test Method for Tensile Properties of Thin Plastic Sheeting"). A tensile testing apparatus, (e.g., an INSTRON tensile testing apparatus such as Model 5544 Tensile Tester or equivalent, from Instron Industrial Products, Norwood, Mass., USA), is used for the collection of film data. A minimum of three test specimens, each cut with reliable cutting tools to ensure dimensional stability and reproducibility (e.g., a JDC precision sample cutter, Model 1-10, from Thwing Albert Instrument Company, Philadelphia, Pa., USA), are tested in the machine direction (MD) (where applicable), i.e., water-soluble film roll winding/unwinding direction, for each measurement. Water-soluble films are to be pre-conditioned to testing environmental conditions for a minimum of 48 hours. Tests are conducted in the standard laboratory atmosphere of about 23±2.0° C. and 35±5% relative humidity, unless otherwise noted. 1"-wide (2.54 cm) samples of a single film sheet having a thickness of 3.0±0.15 mil (or 76.2±3.8 μm) are prepared. The samples are transferred to the tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (e.g., INSTRON grips having model number 2702-032 faces, which are rubber coated and 25 mm wide, or equivalent). The samples are mounted into the tensile testing machine, elongated at a determined rate, and analyzed to determine the properties to be calculated. The average of minimum three test specimens is calculated and reported.

Tensile strength is calculated by dividing the maximum load, or load at break, by the original minimum cross-sectional area of the specimen. The result shall be expressed in force per unit area, usually megapascals (or pounds-force per square inch).

Water Vapor Transmission Rate Test Method

The Water Vapor Transmission Rate Test Method covers a procedure according to ASTM F-1249-13 (Standard Test Method for Water Vapor Transmission Rate Through Plastic Film and Sheeting Using a Modulated Infrared Sensor, dated as of 2017) for determining the rate of water vapor transmission through flexible barrier materials. This method is applicable to sheets and films up to 3 mm (0.1 in.) in thickness consisting of single or multilayer synthetic or natural polymers and foils, including coated materials. This Test Method provides for the determination of the water vapor transmission rate (WVTR).

The water vapor transmission rate is measured according to ASTM F-1249-13 at a temperature of 40° C.±0.56° C. and at a relative humidity of (RH) 50%±3%. Samples may be analyzed using a water vapor transmission rate testing apparatus, such as a MOCON Permatran-W 3/33 (supplied by Mocon, Inc., Minneapolis, Minn., USA). Samples are prepared and do not include the pressure sensitive adhesive. For materials outside of the Scope (§ 1.1) of ASTM F-1249-13, the Water Vapor Transmission Rate Test Method may not apply.

A dry chamber is separated from a wet chamber of known temperature and humidity by the film sample to be tested. The dry chamber and the wet chamber make up a diffusion cell in which the test film sample is sealed. Water vapor diffusing through the film sample mixes with gas in the dry chamber and is carried to a pressure-modulated infrared sensor. This sensor measures the fraction of infrared energy absorbed by the water vapor and produces an electrical signal, the amplitude of which is proportional to water vapor concentration. The amplitude of the electrical signal produced by the test film is then compared to the signal produced by measurement of a calibration film of known water vapor transmission rate. This information is then used to calculate the rate at which moisture is transmitted through the film sample being tested.

The Test Method may be as follows:
(1) Cut a film sample test specimen to approximately 10 cm by 10 cm (4 in. by 4 in.)
(2) Measure specimen thickness at four equally spaced points within the test area and at the center in accordance with guidelines described in ASTM D374 (Test Methods for Thickness of Solid Electrical Insulation).
(3) Lightly grease the cell sealing surface and the cell O-ring of the water vapor transmission rate apparatus used.
(4) For earlier model WVTR apparatuses that require the use of distilled water or saturated salt solutions, insert one to three absorbent pads into the lower half-cell and dampen with distilled water or a saturated salt solution. Otherwise, for newer WVTR apparatuses, follow the manufacturer's instructions for generating the desired relative humidity.
(5) Affix the test film to the diffusion cell following the manufacturer's instructions.
(6) If using a separate conditioning rack, clamp the assembled cell in the conditioning rack. Allow the film to condition in the diffusion cell until steady state has been attained.
(7) Measure the WVTR of the film specimen following the manufacturer's instructions. Record temperature of each test with reference to a thermometer or thermocouple installed in the test chamber thermometer well. Temperature is a critical parameter affecting the measurement of WVTR. During testing, monitor the temperature, periodically, to the nearest 0.5° C. Report the average temperature and the range of temperatures observed during the test.

Calculating the Water Vapor Transmission Rate:
If using a recorder, calculate water vapor transmission rate using the formula:

$$WVTR = C(ES-EO)$$

where:
C=a calibration factor expressing rate as a function of voltage (or mV). The value of C is derived from tests of a known reference film
EO=permeation system zero level voltage, and
ES=equilibrium voltage obtained with the test specimen.
Newer computer-controlled systems will automatically calculate the WVTR.

The Water Vapor Transmission Rate is measured in (or converted to) units of $g/(m^2 \cdot day)$.

Undeformed Thickness Test Method

Undeformed thickness, or caliper, may be performed using ASTM D-5729 using a pad caliper with a known pressure (0.1 psi) and a gage sensor. A Qualitest Thickness Tester, Model CHY-C2, available from Qualitest (Ft. Lauderdale, Fla., USA) may be used. A single layer of film is measured perpendicular to the major face of the water-soluble multilayer film composite when the single layer of film is lying flat in a planar condition.

EXAMPLES

The following water-soluble films were prepared and tested for film tensile strength, undeformed thickness (i.e., caliper), and water vapor transmission rate per the test methods described herein.

Table 1 details film compositions used to prepare example water-soluble films. Each of the films each included a polyvinyl alcohol (PVOH) resin and one or more plasticizers.

TABLE 1

| Film Composition Code | PVOH Resin[1] in Film (% by weight of the composition) | Plasticizer in Film (% by weight of the composition) | |
|---|---|---|---|
| | | Glycerol (% by weight of the composition) | Sorbitol (% by weight of the composition) |
| F3 | 80 | 10 | 10 |
| F5 | 80 | 15 | 5 |

[1]PVOH resin used was Selvol ™ Polyvinyl Alcohol 205, available from Sekisui Specialty Chemicals America, LLC (Dallas, Texas, USA). Selvol ™ 205 has the following specification: molecular weight (kD) 31-50; gas permeation chromatography (GPC) molecular weight (kD) 58.4; GPC PDI (polydispersity index) 1.13; degree of hydrolysis (mole %) 88 ± 1.00; 4% aqueous solution viscosity, 20° C. (cP) 5.2-6.2; total volatiles including water (wt %) max. 5.00; total organic volatiles (wt. %) max. 1.00; methanol (wt. %) max 0.90; ash-ISE as % Na$_2$O, corrected volatiles (wt. %) max 0.70; 4% aqueous solution pH 5.50 ± 1.00.

Tables 2A and 2B summarize the water-soluble film tensile strength, and undeformed thickness (i.e., caliper), per the test methods described herein. Three samples of each film example were cut and tested per the Tensile Strength Test Method described herein. A JDC precision sample cutter, Model 1-10, from Thwing Albert Instrument Company (Philadelphia, Pa., USA) was used as the cutting apparatus. An INSTRON tensile testing apparatus, Model 5544 Tensile Tester, and INSTRON grips having Model Number 2702-032 faces, which are rubber coated and 25 mm wide, from Instron Industrial Products (Norwood, Mass., USA) was used as the tensile testing apparatus, grips, and faces. The results of the three samples were then averaged to provide the data below for a first data set ("replicate 1"). Three separate samples of each film example were cut and tested per the test methods described herein for a second data set ("replicate 2"). Replicates 1 and 2 were each performed at a date no more than a 12-month period from each other. The three samples of each film for both replicates 1 and 2 were conditioned for 48 hours at the lab conditions below then tested for tensile strength and undeformed thickness. Each example was tested under the conditions detailed in Table 2A.

TABLE 2A

Conditions for Testing of Tensile Strength and Undeformed Thickness of the Water-Soluble Film Examples

|  | Replicate 1 - Extruded | Replicate 1 - Solution cast | Replicate 2 - Extruded | Replicate 2 - Solution cast |
|---|---|---|---|---|
| Loan cell | 100N | 100N | 100N | 100N |
| Gauge length | 2 in. | 2 in. | 2 in. | 2 in. |
| Cut sample size | 1 in. width | 1 in. width | 1 in. width | 1 in. width |
| Crosshead speed | 500 mm/min. | 500 mm/min. | 500 mm/min. | 500 mm/min. |
| Conditioning lab conditions: (Temperature/ Relative Humidity) | 23° C./50% | 23° C./50% | 22° C./40% | 22° C./40% |
| Testing lab conditions: (Temperature/ Relative Humidity) | 21° C./34% | 22° C./41% | 22° C./40% | 22° C./40% |

TABLE 2B

Tensile Strength and Undeformed Thickness of the Water-Soluble Film Examples

| | Film Composition Code | Manufacture Process | Replicate | Results Tensile Strength (MPa) | Results Undeformed Thickness (μm) |
|---|---|---|---|---|---|
| Example 1 | F3 | Extrusion | 1 | 35.5 ± 1.0 | 77 |
|  |  |  | 2 | 28.2 ± 4.4 | 77 |
| Comparative Example 2 | F3 | Solution cast | 1 | 23.6 ± 2.7 | 78 |
|  |  |  | 2 | 19.7 ± 4.8 | 78 |
| Example 3 | F5 | Extrusion | 1 | 29.1 ± 1.3 | 76 |
|  |  |  | 2 | 26.8 ± 1.4 | 76 |
| Comparative Example 4 | F5 | Solution cast | 1 | 21.2 ± 0.3 | 78 |
|  |  |  | 2 | 15.0 ± 2.4 | 78 |

As can be seen from the results of Table 2B, the tensile strength and undeformed thickness of examples 1 and 3, films formed by an extrusion process, have tensile strengths and undeformed thicknesses substantially similar to comparative examples 2 and 4, films formed by a solution cast process, however, the extruded films were simpler in complexity to formulate.

Tables 3A and 3B summarize the water-soluble film water vapor transmission rate per the test methods described herein. Two samples of each film example were tested per the Water Vapor Test Method described herein, to provide a first data set ("replicate 1") and a second data set ("replicate 2"). The samples were analyzed on a Permatran-W Water Vapor Permeability Instrument. The samples were tested by MOCON Laboratory (Minneapolis, Minn., USA). The samples had an undeformed thickness of about ~75 μm.

Each example was tested under the conditions detailed in Table 3A.

TABLE 3A

Conditions for Testing of Water Vapor Transmission Rate of the Water-Soluble Film Examples

| Test Gas | Test gas humidity |
|---|---|
| Water Vapor | 50% relative humidity |
| Test Temperature | 40.0° C. |
| Carrier Gas | 100% N$_2$, dry |
| Sample masked area size | 5 cm$^2$ |

TABLE 3B

Water Vapor Transmission Rate of the Water-Soluble Film Examples

| | Film Composition Code | Manufacture Process | Replicate | Results Water Vapor Transmission Rate g/(m$^2$ · day)* |
|---|---|---|---|---|
| Example 1 | F3 | Extrusion | 1 | 74.3 |
|  |  |  | 2 | 74.6 |
| Comparative Example 2 | F3 | Solution cast | 1 | 82.6 |
|  |  |  | 2 | 76.3 |
| Example 3 | F5 | Extrusion | 1 | 52.3 |
|  |  |  | 2 | 75.1 |
| Comparative Example 4 | F5 | Solution cast | 1 | 55.9 |
|  |  |  | 2 | 63.5 |

*To convert the above results to g/(100 in$^2$/day), divide the above values by 15.5.

As can be seen from the results of Table 3B, the water vapor transmission rates of examples 1 and 3, films formed by an extrusion process, have water vapor transmission rates substantially similar to comparative examples 2 and 4, films formed by a solution cast process, however, the extruded films were simpler in complexity to formulate.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:
1. A water-soluble unit dose article comprising:
one or more layers of a first water-soluble film;
one or more layers of a second water-soluble film;
wherein the first water-soluble film is sealed to the second water-soluble film to form at least one sealed compartment;
at least one household care composition at least partially enclosed within the sealed compartment;
wherein each of the first water-soluble film and the second water-soluble film are formed by an extrusion process, and wherein each independently comprises:
a polyvinyl alcohol (PVOH) polymeric resin and/or blend thereof, wherein from about 95% to about 100% of the polyvinyl alcohol (PVOH) polymeric resin and/or blend thereof is characterized by having a weight average molecular weight of from about 20,000 Da to about 94,500 Da, and wherein no more than about 5% of the polyvinyl alcohol (PVOH) polymeric resin and/or blend thereof is characterized by having a weight average molecular weight of greater than about 95,000 Da;
only two plasticizers,
wherein the plasticizers consist of from about 5% to about 20%, by weight of the film, of glycerol, and from about 5% to about 15%, by weight of the film, of sorbitol;
wherein each of the first water-soluble film and the second water-soluble film independently comprises from about 50% to about 95%, by weight of the water-soluble film, of the polyvinyl alcohol (PVOH) polymeric resin and/or blend thereof;
wherein the polyvinyl alcohol (PVOH) polymeric resin and/or blend thereof comprises a polyvinyl alcohol (PVOH) homopolymer;
wherein each of the first water-soluble film and the second water-soluble film independently is characterized by a tensile strength of from 26.8 mPa to about 40 mPa as measured according to the Tensile Strength Test Method; and
wherein each of the first water-soluble film and the second water-soluble film independently exhibits a water vapor transmission rate of from about 50 g/(m²·day) to about 90 g/(m²·day) as measured according to the Water Vapor Transmission Test Method.

2. The water-soluble unit dose article according to claim 1, wherein from about 95% to about 100% of the polyvinyl alcohol (PVOH) polymeric resin and/or blend thereof is characterized by having a weight average molecular weight of from about 25,000 Da to about 90,000 Da.

3. The water-soluble unit dose article according to claim 1, wherein the polyvinyl alcohol (PVOH) polymeric resin and/or blend thereof is characterized by having a degree of hydrolysis of from about 60% to about 99%.

4. The water-soluble unit dose article according to claim 1, wherein each of the first water-soluble film and the second water-soluble film independently has an undeformed thickness of from about 5 μm to about 200 μm.

5. The water-soluble unit dose article according to claim 1, wherein each of the first water-soluble film and the second water-soluble film independently further comprises one or more components selected from the group consisting of aversive agents, cross-linking agents, antiblocking agents, detackifying agents, extenders, fillers, lubricants, release agents, surfactants, gas-barrier additives, and combinations thereof.

6. The water-soluble unit dose article according to claim 1, wherein each of the first water-soluble film and the second water-soluble film independently further comprises one or more aversive agents.

7. The water-soluble unit dose article according to claim 1, wherein the household care composition is a laundry detergent composition.

8. The water-soluble unit dose article according to claim 1, wherein the first water-soluble film is chemically different than the second water-soluble film.

9. The water-soluble unit dose article according to claim 1, wherein the first water-soluble film is substantially identical to the second water-soluble film.

10. The water-soluble unit dose article according to claim 1, wherein the water-soluble unit dose article comprises at least two sealed compartments, a first compartment and second compartment, wherein the second compartment is superposed on the first compartment.

11. A water-soluble unit dose article comprising:
a first water-soluble multilayer film composite comprising two or more layers of a water-soluble film;
a second water-soluble multilayer film composite comprising two or more layers of the water-soluble film;
wherein the first and second water-soluble multilayer film composites are each made by an extrusion process,
wherein the first water-soluble multilayer film composite is sealed to the second water-soluble multilayer film composite to form at least one sealed compartment;
at least one household care composition at least partially enclosed within the sealed compartment;
wherein the water-soluble film of each of the layers independently comprises:
a polyvinyl alcohol (PVOH) polymeric resin and/or blend thereof, wherein from about 95% to about 100% of the polyvinyl alcohol (PVOH) polymeric resin and/or blend thereof is characterized by having a weight average molecular weight of from about 20,000 Da to about 94,500 Da, and wherein no more than about 5% of the polyvinyl alcohol (PVOH) polymeric resin and/or blend thereof is characterized by having a weight average molecular weight of greater than about 95,000 Da;
only two plasticizers,
wherein the plasticizers consist of from about 5% to about 20%, by weight of the film, of glycerol, and from about 5% to about 15%, by weight of the film, of sorbitol;
wherein the water-soluble film of each of the layers independently comprises from about 50% to about 95%, by weight of the water-soluble film, of the polyvinylalcohol (PVOH) polymeric resin and/or blend thereof;
wherein the polyvinyl alcohol (PVOH) polymeric resin and/or blend thereof comprises a polyvinyl alcohol (PVOH) homopolymer; and
wherein each of the first water-soluble multilayer film composite and the second water-soluble multilayer film composite independently comprises at least an inward facing layer and an outward facing layer, wherein the inward facing layer of the first water-soluble multilayer film composite is chemically different than the outward facing layer of the first water-soluble multilayer film composite.

12. A method of making a water-soluble unit dose article according to claim 1, the method comprising the steps of:
- extruding one or more layers of the first water-soluble film;
- extruding one or more layers of the second water-soluble film;
- shaping the first water-soluble film to form an open compartment;
- providing the household care composition;
- loading the open compartment with the household care composition; and
- sealing the open compartment with the second water-soluble film to form a water-soluble unit dose article having a sealed compartment having the household care composition enclosed therein.

13. The method according to claim 12, wherein the open compartment is sealed with at least a second sealed compartment, such that the water-soluble unit dose article formed by the method is a multi-compartment water-soluble unit dose article having superposed compartments.

14. The method according to claim 12, wherein the first water-soluble film is chemically different than the second water-soluble film.

15. The method according to claim 12, wherein the first water-soluble film is substantially identical to the second water-soluble film.

* * * * *